(12) United States Patent
Yamashita

(10) Patent No.: US 12,553,491 B2
(45) Date of Patent: Feb. 17, 2026

(54) SHOCK ABSORBER

(71) Applicant: Hitachi Astemo, Ltd., Ibaraki (JP)

(72) Inventor: Mikio Yamashita, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 400 days.

(21) Appl. No.: 18/027,181

(22) PCT Filed: Sep. 21, 2021

(86) PCT No.: PCT/JP2021/034555
§ 371 (c)(1),
(2) Date: Mar. 20, 2023

(87) PCT Pub. No.: WO2022/075055
PCT Pub. Date: Apr. 14, 2022

(65) Prior Publication Data
US 2023/0349440 A1 Nov. 2, 2023

(30) Foreign Application Priority Data
Oct. 9, 2020 (JP) ................. 2020-171046

(51) Int. Cl.
F16F 9/348 (2006.01)
F16F 9/512 (2006.01)

(52) U.S. Cl.
CPC ............ *F16F 9/3481* (2013.01); *F16F 9/512* (2013.01); *F16F 2222/12* (2013.01)

(58) Field of Classification Search
CPC .......... F16F 9/3481; F16F 9/512; F16F 9/185; F16F 9/5126; F16F 2222/12
See application file for complete search history.

(56) References Cited

U.S. PATENT DOCUMENTS

| | | | |
|---|---|---|---|
| 2009/0084647 A1* | 4/2009 | Maneyama | F16F 9/34 188/314 |
| 2015/0159726 A1* | 6/2015 | Kim | F16F 9/5126 188/313 |

(Continued)

FOREIGN PATENT DOCUMENTS

| | | | |
|---|---|---|---|
| DE | 112016004157 T5 * | 6/2018 | ............. F16F 9/185 |
| DE | 102020206417 A1 * | 11/2020 | ............ F16F 9/3485 |

(Continued)

OTHER PUBLICATIONS

International Search Report received in corresponding International Application No. PCT/JP2021/034555 dated Nov. 2, 2021.

(Continued)

*Primary Examiner* — Vishal R Sahni
(74) *Attorney, Agent, or Firm* — MATTINGLY & MALUR, PC

(57) ABSTRACT

A shock absorber includes a first passage through which a working fluid flows from one chamber in a cylinder due to movement of a piston, a second passage which is provided in parallel with the first passage, a disk which is provided in the first passage and generates a damping force, a spool member, having a tubular shape, which is capable of changing a biasing force against the disk by moving in an axial direction, a pilot chamber which is provided in the second passage, located on an inner peripheral side of the spool member, and generates a biasing force against the disk in the spool member, and a closing member which blocks a flow of the working fluid from the pilot chamber to the other chamber and is provided to be movable with respect to the spool member.

3 Claims, 19 Drawing Sheets

(56) References Cited

U.S. PATENT DOCUMENTS

| | | | |
|---|---|---|---|
| 2015/0247547 A1* | 9/2015 | Yamashita | F16F 9/585 188/313 |
| 2016/0017952 A1* | 1/2016 | Kim | F16F 9/3482 188/322.13 |
| 2016/0025181 A1* | 1/2016 | Nowaczyk | F16F 9/348 29/434 |
| 2018/0216690 A1 | 8/2018 | Yamashita | |
| 2021/0025471 A1 | 1/2021 | Kobayashi et al. | |
| 2023/0349440 A1* | 11/2023 | Yamashita | F16F 9/512 |

FOREIGN PATENT DOCUMENTS

| | | | | |
|---|---|---|---|---|
| DE | 102020207309 A1 * | 12/2020 | | F16F 9/5126 |
| JP | 61-109933 A | 5/1986 | | |
| JP | 2009-85245 A | 4/2009 | | |
| JP | 2019-143729 A | 8/2019 | | |
| WO | 2017/047661 A1 | 3/2017 | | |

OTHER PUBLICATIONS

Written Opinion received in corresponding International Application No. PCT/JP2021/034555 dated Nov. 2, 2021.

* cited by examiner

SHOCK ABSORBER

TECHNICAL FIELD

The present invention relates to a shock absorber.

Priority is claimed on Japanese Patent Application No. 2020-171046, filed Oct. 9, 2020, the content of which is incorporated herein by reference.

BACKGROUND ART

There is a shock absorber of which a damping force is variable in accordance with a piston frequency (see, for example, Patent Document 1).

CITATION LIST

Patent Document

[Patent Document 1]
International Publication No. WO2017/047661

SUMMARY OF INVENTION

Technical Problem

There is a demand for miniaturization in a shock absorber.

The present invention provides a shock absorber that can be miniaturized.

Solution to Problem

According to an aspect of the present invention, a shock absorber includes a first passage through which a working fluid flows out from one of two chambers due to movement of a piston, a second passage which is provided parallel to the first passage, a disk which is provided in the first passage and generates a damping force, a spool member, having a tubular shape, which is capable of changing a biasing force against the disk by moving in an axial direction, a pilot chamber which is provided in the second passage, located on an inner peripheral side of the spool member, and generates a biasing force against the disk in the spool member, and a closing member which blocks a flow of the working fluid from the pilot chamber to the other chamber out of the two chambers and is provided to be movable with respect to the spool member.

According to another aspect of the present invention, a shock absorber includes a first passage through which a working fluid flows out from one of two chambers due to movement of a piston, a disk which is provided in the first passage and generates a damping force, an outer cylinder, having a bottomed tubular shape, which is provided on an outer peripheral side of the cylinder, and a base valve which is provided at a bottom portion of the outer cylinder and separates the one chamber and a chamber between the outer cylinder and the cylinder. The base valve is provided with a second passage which is provided in parallel with the first passage and a frequency sensitive mechanism which is provided in the second passage and varies a damping force in accordance with a frequency of the piston. The frequency sensitive mechanism is provided on the bottom portion side of the base valve.

Advantageous Effects of Invention

According to the shock absorber described above, miniaturization can be achieved.

DESCRIPTION OF EMBODIMENTS

First Embodiment

Figure 1:
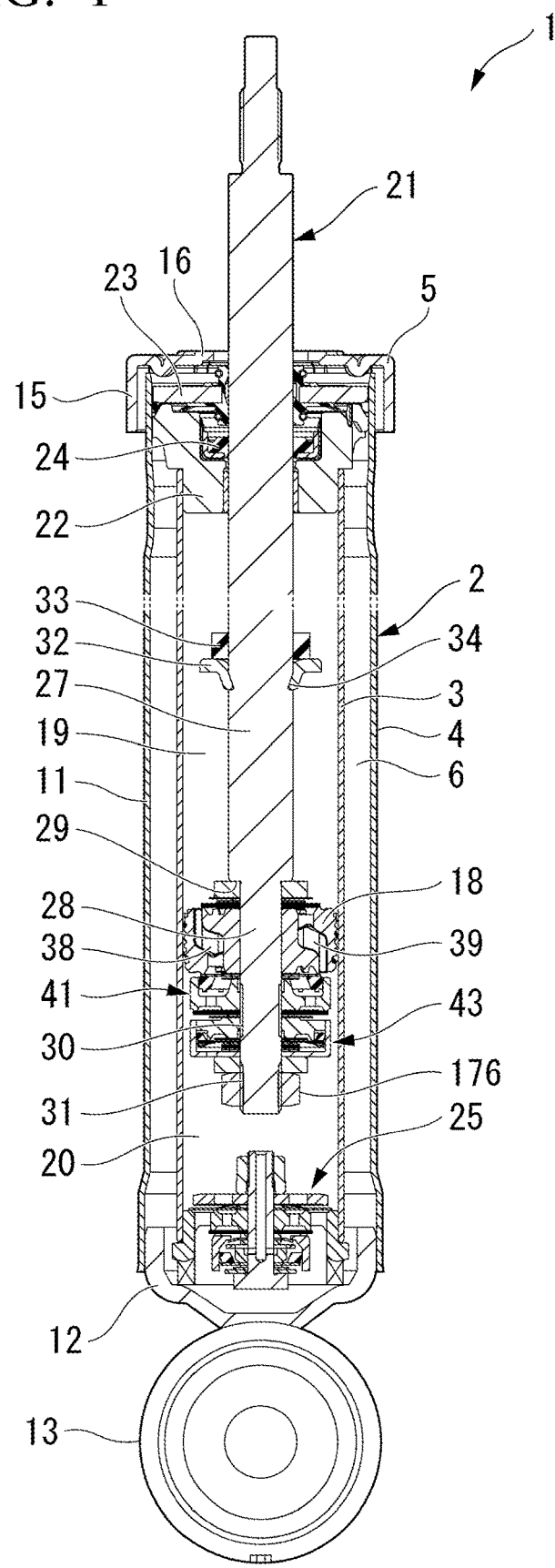
FIG. 1 is a cross-sectional view illustrating a shock absorber according to a first embodiment of the present invention.

A first embodiment of the present invention will be described below with reference to FIGS. 1 to 9. Note that, for ease of description, description will be given below on the assumption that upper sides in FIG. 1 to FIG. 5, FIG. 7, FIG. 9 to FIG. 11, FIG. 13, FIG. 14, FIG. 16, FIG. 17, and FIG. 19 are referred to as "upper", and lower sides in the drawings are referred to as "lower".

As illustrated in FIG. 1, a shock absorber 1 of the first embodiment is a so-called double cylinder hydraulic shock absorber. The shock absorber 1 includes a cylinder member 2 filled with a working fluid. The cylinder member 2 includes a cylindrical cylinder 3, a bottomed cylindrical outer cylinder 4 that has a diameter larger than the diameter of the cylinder 3 and is provided concentrically with respect to the cylinder 3 so as to cover the cylinder 3 on the outer peripheral side with respect to the cylinder 3, and a cover 5 that covers the upper opening side of the outer cylinder 4. In the cylinder member 2, a reservoir chamber 6 is formed between the cylinder 3 and the outer cylinder 4. In other words, the reservoir chamber 6 is provided on the outer peripheral side of the cylinder 3. An oil liquid as a working fluid is sealed in the cylinder 3, and an oil liquid as a working fluid and a gas are sealed in the reservoir chamber 6.

The outer cylinder 4 is constituted by a cylindrical body member 11 and a bottom member 12 that is fitted and fixed to a lower side of the body member 11 to close a lower portion of the body member 11. A mounting eye 13 is fixed on the outer side of the bottom member 12 which is opposite to the body member 11.

The cover 5 includes a tubular portion 15 and an inner flange portion 16 extending inward in the radial direction from an upper end side of the tubular portion 15. The cover 5 covers the body member 11 so that an upper end opening of the body member 11 is covered with the inner flange portion 16 and the outer peripheral surface of the body member 11 is covered with the tubular portion 15. In this state, the cover 5 is fixed to the body member 11 by caulking a portion of the tubular portion 15 inward in the radial direction.

A piston 18 is slidably provided in the cylinder 3 of the cylinder member 2. The piston 18 divides the inside of the cylinder 3 into two chambers, that is, an upper chamber 19 and a lower chamber 20. The upper chambers 19 and the lower chamber 20 are filled with an oil liquid.

A piston rod 21 is inserted in the cylinder member 2. One end of the piston rod 21 is connected to the piston 18, and the other end thereof extends to the outside of the cylinder member 2 including the cylinder 3. The piston 18 and the piston rod 21 move integrally. During an extension stroke for increasing the amount of protrusion of the piston rod 21 from the cylinder member 2, the piston 18 moves toward the upper chamber 19. During a contraction stroke for decreasing the amount of protrusion of the piston rod 21 from the cylinder member 2, the piston 18 moves toward the lower chamber 20.

A rod guide 22 is fitted to the upper opening sides of the cylinder 3 and the outer cylinder 4, and a sealing member 23 is fitted to the outer cylinder 4 above the rod guide 22 on the outer side of the cylinder member 2. A friction member 24 is provided between the rod guide 22 and the sealing member 23. All of the rod guide 22, the sealing member 23, and the friction member 24 have an annular shape. The piston rod 21 is slidably inserted inside each of the rod guide 22, the friction member 24, and the sealing member 23.

Here, the rod guide 22 supports the piston rod 21 so as to be axially movable while restricting its radial movement, and guides the movement of the piston rod 21. The sealing member 23 is in close contact with the outer cylinder 4 at its outer peripheral portion. The inner peripheral portion of the sealing member 23 is slidably in contact with the outer peripheral portion of the piston rod 21 moving in the axial direction to prevent an oil liquid in the cylinder 3 and a high pressure gas and an oil liquid in the reservoir chamber 6 in the outer cylinder 4 from leaking outside. The friction member 24 is slidably in contact with the outer peripheral portion of the piston rod 21 at its inner peripheral portion to generate frictional resistance on the piston rod 21. Note that the friction member 24 is not intended for sealing.

The outer peripheral portion of the rod guide 22 has a stepped shape in which an upper portion has a larger diameter than a lower portion. In the rod guide 22, the small-diameter lower portion is fitted to the inner peripheral portion of the upper end of the cylinder 3, and the large-diameter upper portion is fitted to the inner peripheral portion of the upper portion of the outer cylinder 4.

A base valve 25 that defines the lower chamber 20 and the reservoir chamber 6 is installed on the bottom member 12 of the outer cylinder 4. The inner peripheral portion of the lower end of the cylinder 3 is fitted to the base valve 25. A portion, which is not illustrated in the drawing, of the upper end portion of the outer cylinder 4 is crimped inward in the radial direction. The crimped portion and the rod guide 22 sandwich the sealing member 23.

The piston rod 21 includes a main shaft portion 27 and a mounting shaft portion 28 having a smaller diameter. The mounting shaft portion 28 is disposed inside the cylinder member 2. The piston 18 and the like are attached to the mounting shaft portion 28. An end portion of the main shaft portion 27 on the mounting shaft portion 28 side constitutes a shaft stepped portion 29 that extends in a direction perpendicular to the axis of the main shaft portion 27. A passage groove 30 extending in the axial direction is formed in the outer peripheral portion of the mounting shaft portion 28 at an axially intermediate position. A male screw 31 is formed in the outer peripheral portion of the mounting shaft portion 28 at a tip position on a side opposite to the main shaft portion 27 in the axial direction. The passage groove 30 is formed such that the cross-sectional shape of a plane perpendicular to the central axis of the piston rod 21 is rectangular, square, or D-shaped.

A stopper member 32 and a cushioning body 33, both of which are annular, are provided at a portion of the piston rod 21 between the piston 18 of the main shaft portion 27 and the rod guide 22. The piston rod 21 is inserted at the inner peripheral side of the stopper member 32. The stopper member 32 is fixed to the main shaft portion 27 by being caulked to a fixing groove 34 that is recessed inward in the radial direction from the outer peripheral surface of the main shaft portion 27.

The piston rod 21 is also inserted into the cushioning body 33. The cushioning body 33 is disposed between the stopper member 32 and the rod guide 22.

In the shock absorber 1, for example, a protruding portion of the piston rod 21 from the cylinder member 2 is disposed at an upper portion of the shock absorber 1. The protruding portion is supported by a vehicle body. On the other hand, the mounting eye 13 on the cylinder member 2 side is disposed at a lower portion of the shock absorber 1. The mounting eye 13 is connected to a wheel side.

In contrast, the cylinder member 2 side may be supported by the vehicle body, and the piston rod 21 may be connected to the wheel side.

Figure 2:
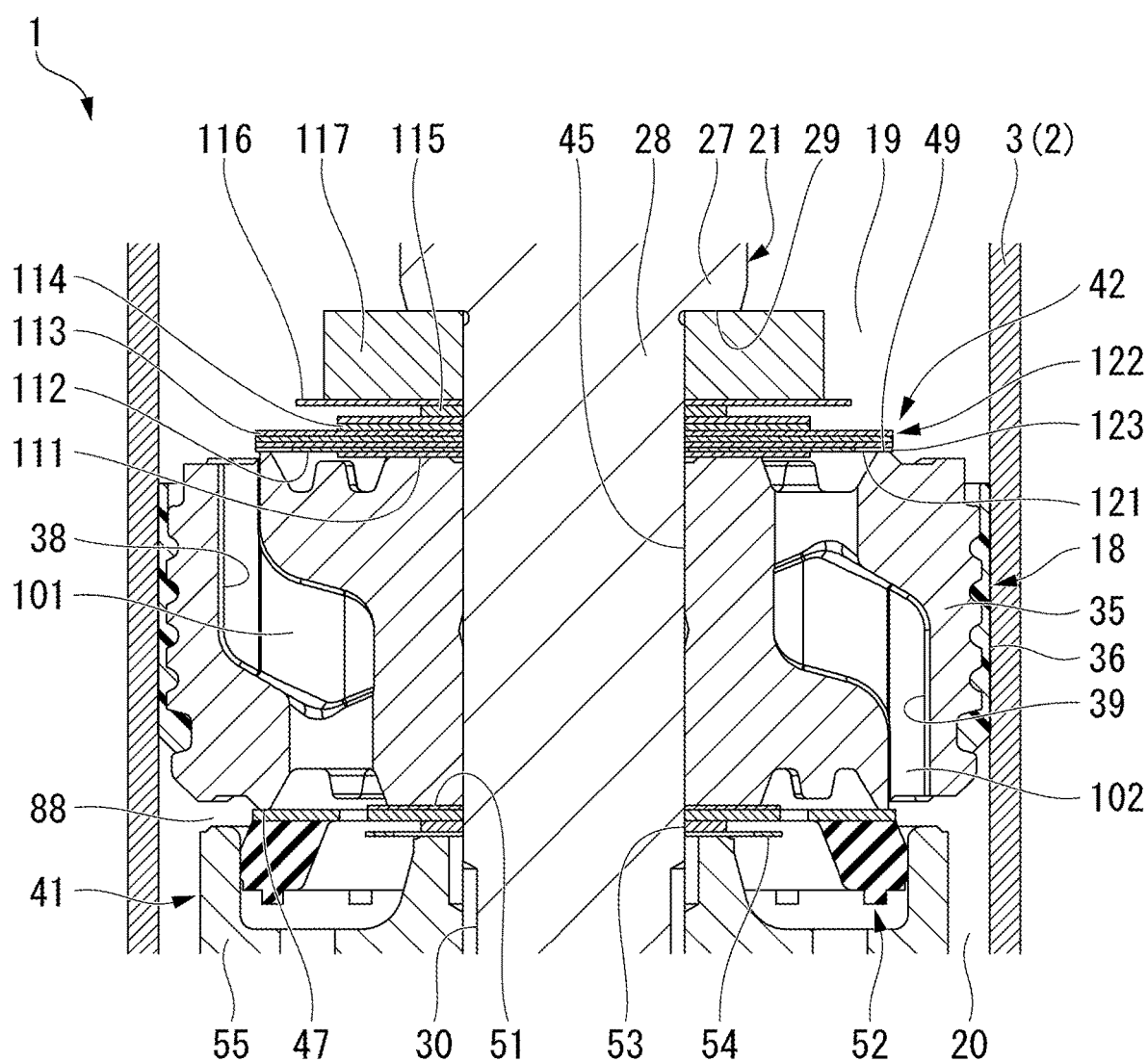
FIG. 2 is a cross-sectional view of the vicinity of a piston illustrating the shock absorber according to the first embodiment of the present invention.

As illustrated in FIG. 2, the piston 18 includes a metal piston body 35 supported by the piston rod 21 and an annular sliding member 36, made of a synthetic resin, which is integrally mounted on the outer peripheral surface of the piston body 35 and slides inside the cylinder 3.

A plurality of passage holes 38 and a plurality of passage holes 39 are provided in the piston body 35. Note that FIG. 2 illustrates only one of the plurality of passage holes 38 and one of the plurality of passage holes 39 due to a positional relationship between the cross sections thereof.

The plurality of passage holes 38 allow the upper chamber 19 and the lower chamber 20 to communicate with each other. The plurality of passage holes 38 internally form passages through which an oil liquid flows from the upper chamber 19 toward the lower chamber 20 during the movement of the piston 18 toward the upper chamber 19 side, that is, during an extension stroke.

The plurality of passage holes 39 internally form passages through which an oil liquid flows from the lower chamber 20 toward the upper chamber 19 during the movement of the piston 18 toward the lower chamber 20 side, that is, during the contraction stroke.

The passage holes 38 are formed with a uniform pitch in the circumferential direction with one passage hole 39 interposed therebetween. One side (the upper side in FIG. 2) of the piston 18 in the axial direction in the passage hole 38 opens outward in the radial direction. The other side (the lower side in FIG. 2) of the piston 18 in the axial direction in the passage hole 38 opens inward in the radial direction.

Figure 3:
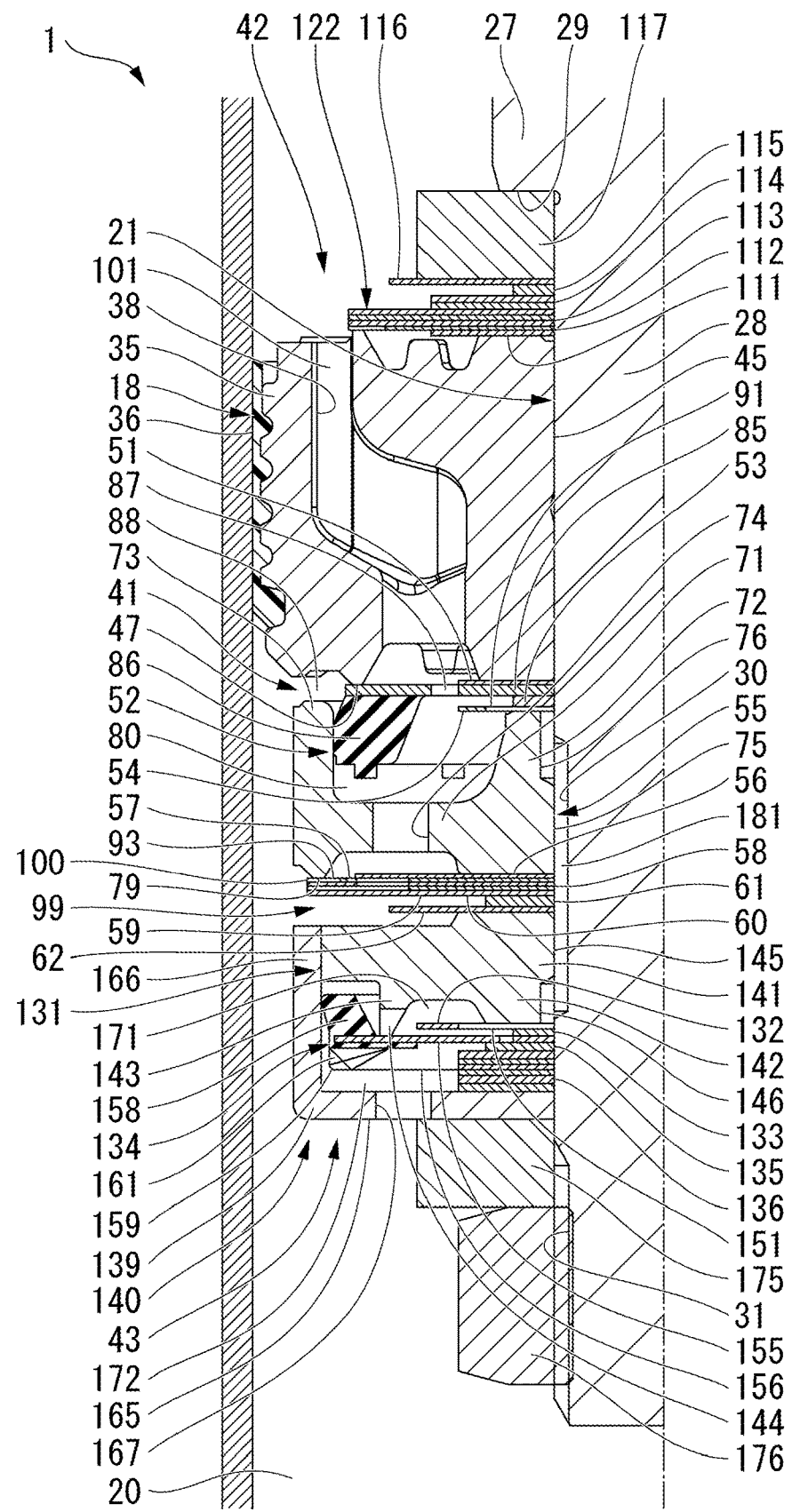
FIG. 3 is a cross-sectional view of one side of the vicinity of the piston illustrating the shock absorber according to the first embodiment of the present invention.

As illustrated in FIG. 3, a damping force generation mechanism 41 for generating a damping force is provided for half of the passage holes 38 among all of the passage holes 38 and 39. The damping force generation mechanism 41 is disposed on the lower chamber 20 side, which is one end side of the piston 18 in the axial direction, and is attached to the piston rod 21. The passage hole 38 constitutes an extension-side passage therein through which an oil liquid passes when the piston rod 21 and the piston 18 move to the extension side (the upper side in FIG. 3). The damping force generation mechanisms 41 provided for half of the passage holes 38 are extension-side damping force generation mechanisms that suppress the flow of an oil liquid in the passages in the extension-side passage holes 38 to generate a damping force.

A frequency sensitive mechanism 43 is attached to the mounting shaft portion 28 of the piston rod 21. The frequency sensitive mechanism 43 is adjacent to the damping force generation mechanism 41 on a side opposite to the piston 18. The frequency sensitive mechanism 43 makes a damping force variable in response to the frequency of a reciprocating motion of the piston 18 during the extension stroke (hereinafter referred to as piston frequency).

Further, as illustrated in FIG. 2, passage holes 39, which constitute the remaining half of all of the passage holes 38 and 39, are formed with a uniform pitch in the circumferential direction with one passage hole 38 interposed therebetween. In the passage hole 39, the other side (the lower side in FIG. 2) of the piston 18 in the axial direction opens outward in the radial direction. One side (the upper side in FIG. 2) of the piston 18 in the axial direction opens inward in the radial direction.

In addition, a damping force generation mechanism 42 for generating a damping force is provided in the remaining half of the passage holes 39. The damping force generation mechanism 42 is disposed on the upper chamber 19 side in the axial direction, which is the other end side of the piston 18 in the axial direction, and is attached to the piston rod 21.

The passage holes 39 form a contraction-side passage therein through which an oil liquid passes when the piston rod 21 and the piston 18 move to a contraction side (the lower side in FIG. 2). The damping force generation mechanisms 42 provided for half of the passage holes 39 are contraction-side damping force generation mechanisms that suppress the flow of the oil liquid in the passage in the contraction-side passage holes 39 to generate a damping force.

The piston body 35 has a substantially disk shape. A fitting hole 45 penetrates the piston body 35 in the axial direction is formed at the center of the piston body 35 in the radial direction. The fitting hole 45 is a hole for fitting the mounting shaft portion 28 of the piston rod 21.

A portion between the fitting hole 45 and the passage hole 38 at an end portion of the piston body 35 on the lower chamber 20 side in the axial direction supports the inner peripheral side of the damping force generation mechanism 41. A portion between the fitting hole 45 and the passage hole 39 at an end portion of the piston body 35 on the upper chamber 19 side in the axial direction supports the inner peripheral side of the damping force generation mechanism 42.

An annular valve seat portion 47, which is a portion of the damping force generation mechanism 41, is formed on the outer side in the radial direction of the opening of the passage hole 38 on the lower chamber 20 side at the end portion of the piston body 35 on the lower chamber 20 side in the axial direction. In addition, an annular valve seat portion 49, which is a portion of the damping force generation mechanism 42, is formed on the outer side in the radial direction of the opening of the passage hole 39 on the upper chamber 19 side at the end portion of the piston body 35 on the upper chamber 19 side in the axial direction.

In the piston body 35, the side of the valve seat portion 47 opposite to the fitting hole 45 has a stepped shape of which the height in the axial direction is lower than the valve seat portion 47. An opening of the contraction-side passage hole 39 on the lower chamber 20 side is disposed in the stepped portion. Similarly, in the piston body 35, the side of the valve seat portion 49 opposite to the fitting hole 45 has a stepped shape of which the height in the axial direction is lower than that of the valve seat portion 49. The opening of the extension-side passage hole 38 on the upper chamber 19 side is disposed in the stepped portion.

As illustrated in FIG. 3, the extension-side damping force generation mechanism 41 is a pressure control type valve mechanism. The damping force generation mechanism 41 includes one disk 51, one main valve 52, one disk 53, one disk 54, one seat member 55, one disk 56, one disk 57, one disk 58, one disk 59, one disk 60, one disk 61, and one disk 62 in order from the piston 18 side in the axial direction.

The disks 51, 53, 54, and 56 to 62 and the seat member 55 are made of a metal. Each of the disks 51, 53, 54, and 56 to 62 has a perforated circular flat plate shape, having a fixed thickness, into which the mounting shaft portion 28 of the piston rod 21 can be fitted. Both the main valve 52 and the seat member 55 have an annular shape into which the mounting shaft portion 28 of the piston rod 21 can be fitted.

The seat member 55 includes a perforated disk-shaped bottom portion 71 expanding in a direction perpendicular to the axis, an inner cylindrical portion 72, having a cylindrical shape, which is formed on the inner peripheral side of the bottom portion 71 in the axial direction, and an outer cylindrical portion 73, having a cylindrical shape, which is formed on the outer peripheral side of the bottom portion 71 in the axial direction.

The bottom portion 71 is shifted to one side in the axial direction with respect to the inner cylindrical portion 72 and the outer cylindrical portion 73. A through-hole 74 penetrating the bottom portion 71 in the axial direction is formed in the bottom portion 71.

On the inner side of the inner cylindrical portion 72, a small-diameter hole portion 75 for fitting the mounting shaft portion 28 of the piston rod 21 is formed on the bottom portion 71 side in the axial direction. On the inner side of the inner cylindrical portion 72, a large-diameter hole portion 76 having a larger diameter than the small-diameter hole portion 75 is formed on a side opposite to the bottom portion 71 in the axial direction.

An end portion of the outer cylindrical portion 73 of the seat member 55 on the bottom portion 71 side in the axial direction is an annular valve seat portion 79. The inner side of the seat member 55 including the through-hole 74 is a pilot chamber 80 that applies pressure to the main valve 52 in the direction of the piston 18.

The disk 51 has an outer diameter smaller than the inner diameter of the valve seat portion 47. The main valve 52 includes a metal disk 85 and a rubber sealing member 86 fixed to the disk 85. The disk 85 has a perforated circular flat plate shape, having a fixed thickness, into which the mounting shaft portion 28 of the piston rod 21 can be fitted. The disk 85 has an outer diameter slightly larger than the outer diameter of the valve seat portion 47. The sealing member 86 is fixed to the outer peripheral side of the disk 85 which is opposite to the piston 18 and has an annular shape. A through-hole 87 is formed in the disk 85 inward in the radial direction of the sealing member 86.

The disk 85 can be seated on the valve seat portion 47 of the piston 18. The main valve 52 is provided between a passage in the passage hole 38 provided in the piston 18 and the pilot chamber 80 provided in the seat member 55, and generates a damping force by suppressing the flow of an oil liquid occurring due to the sliding of the piston 18 to the extension side.

The sealing member 86 contacts the inner peripheral surface of the outer cylindrical portion 73 of the seat member 55 over the entire circumference to seal a gap between the main valve 52 and the outer cylindrical portion 73. Thus, the above-mentioned pilot chamber 80 between the main valve 52 and the seat member 55 applies internal pressure to the main valve 52 in the direction of the piston 18. The direction of the piston 18 is a valve closing direction in which the disk 85 is seated on the valve seat portion 47. The inside of the through-hole 87 of the disk 85 serves as a passage for introducing an oil liquid into the pilot chamber 80 from the upper chamber 19 in the cylinder member 2 through the passage in the passage hole 38.

The main valve 52 is a pilot type damping valve having the pilot chamber 80. When the disk 85 is separated from the valve seat portion 47 of the piston 18 to open, the oil liquid from the passage in the passage hole 38 flows to the lower chamber 20 through a passage 88 that expands in the radial direction between the piston 18 and the outer cylindrical portion 73 of the seat member 55. The damping force generation mechanism 41 on the extension side introduces a portion of the flow of the oil liquid into the pilot chamber 80 through the passage in the through-hole 87 of the disk 85 to control the opening of the main valve 52 by the pressure in the pilot chamber 80.

The disk 53 has an outer diameter that is smaller than the outer diameter of the inner cylindrical portion 72 and larger than the inner diameter of the large-diameter hole portion 76. A notch 91 is formed on the inner peripheral side of the disk 54. The notch 91 radially crosses a portion of the inner cylindrical portion 72 which is in contact with the disk 54. For this reason, the passage in the large-diameter hole portion 76 of the seat member 55 and the pilot chamber 80 communicate with each other at all times through the passage in the notch 91.

The disk 56 has an outer diameter smaller than the inner diameter of the valve seat portion 79 of the seat member 55. The disk 57 has an outer diameter slightly larger than the outer diameter of the valve seat portion 79. The disk 57 can be seated on the valve seat portion 79. A notch 93 is formed on the outer peripheral side of the disk 57. The notch 93 radially crosses the valve seat portion 79.

The disks 58, 59, and 60 have the same outer diameter as the outer diameter of the disk 57. The disk 61 has an outer diameter smaller than the outer diameter of the disk 60. The disk 62 has an outer diameter larger than the outer diameter of the disk 61 and smaller than the outer diameter of the disk 60.

The disks 57 to 60 are separable and seatable from the valve seat portion 79 and are separated from the valve seat portion 79. With such a configuration, a disk valve 99 that allows the pilot chamber 80 and the lower chamber 20 to communicate with each other and suppresses the flow of an oil liquid therebetween is configured. The pilot chamber 80 is formed to be surrounded by the main valve 52, the seat member 55, and the disk valve 99. The notch 93 of the disk 57 constitutes a fixed orifice 100 that makes the pilot chamber 80 communicate with the lower chamber 20 even when the disk 57 abuts on the valve seat portion 79.

The disk 62 abuts on the disk 60 when the disk valve 99 is deformed in an opening direction to suppress deformation of the disk valve 99.

The passage in the extension-side passage hole 38 provided in the piston 18, a gap between the main valve 52 and the valve seat portion 47 when opened, the passage 88 that expands in the radial direction between the piston 18 and the outer cylindrical portion 73, the through-hole 87 provided in the disk 85, the pilot chamber 80, the fixed orifice 100, and a gap between the disk valve 99 and the valve seat portion 79 when opened constitute an extension-side first passage 101. In the first passage 101, an oil liquid flows out from the upper chamber 19 toward the lower chamber 20 due to the movement of the piston 18 during the extension stroke.

The damping force generation mechanism 41 on the extension side is provided in the extension-side first passage 101 to generate a damping force.

As illustrated in FIG. 2, the contraction-side damping force generation mechanism 42 includes one disk 111, one disk 112, a plurality of disks 113, a plurality of disks 114, one disk 115, one disk 116, and one annular member 117 in order from the piston 18 side in the axial direction.

The disks 111 to 116 and the annular member 117 are made of a metal. Each of the disks 111 to 116 and the annular member 117 has a perforated circular flat plate shape, having a fixed thickness, into which the mounting shaft portion 28 of the piston rod 21 can be fitted.

The disk 111 has an outer diameter smaller than the inner diameter of the valve seat portion 49 of the piston 18. The disk 112 has an outer diameter slightly larger than the outer diameter of the valve seat portion 49 of the piston 18 and can be seated on the valve seat portion 49. A notch 121 is formed on the outer peripheral side of the disk 112. The notch 121 crosses the valve seat portion 49 in the radial direction.

The plurality of disks 113 have the same outer diameter as the outer diameter of the disk 112. The plurality of disks 114 have an outer diameter smaller than the outer diameter of the disk 113. The disk 115 has an outer diameter smaller than the outer diameter of the disk 114. The disk 116 has an outer diameter larger than the outer diameter of the disk 114 and smaller than the outer diameter of the disk 113.

The annular member 117 has an outer diameter smaller than the outer diameter of the disk 116. The annular member 117 has a thickness and rigidity larger than those of the disks 111 to 116. The annular member 117 abuts on the shaft stepped portion 29 of the piston rod 21.

The disks 112 to 114 are separable and seatable from the valve seat portion 49 and are separated from the valve seat portion 49. The above-described configuration constitutes a disk valve 122 that can open the passage in the passage hole 39 to the upper chamber 19 and suppress the flow of an oil liquid between the upper chamber 19 and the lower chamber 20.

The notch 121 of the disk 112 constitutes a fixed orifice 123 that allows the upper chamber 19 and the lower chamber 20 to communicate with each other even when the disk 112 is in contact with the valve seat portion 49. The annular member 117 restricts the deformation of the disk valve 122 in the opening direction beyond a specified limit.

The passage in the contraction-side passage hole 39 provided in the piston 18, the fixed orifice 123, and a gap between the disk valve 122 and the valve seat portion 49 when opened constitute a first passage 102 on the contraction side.

In the first passage 102 on the contraction side, an oil liquid flows out from the lower chamber 20 toward the upper chamber 19 due to the movement of the piston 18 during the contraction stroke. The contraction-side damping force generation mechanism 42 is provided in the first passage 102 on the contraction side to generate a damping force.

Here, both the disk valve 99 on the extension-side and the disk valve 122 on the contraction side illustrated in FIG. 3 are inner circumference clamped disk valves. However, the present invention is not limited thereto, and the disk valves 99 and 122 may be any mechanism that generates a damping force. For example, the disk valves may be a lift type valve that is biased by a coil spring or may be a poppet valve.

The frequency sensitive mechanism 43 includes one case member main body 131, one disk 132, a plurality of disks 133, one partitioning disk 134, and one disk 135, a plurality of disks 136, and a lid member 139 in order from the damping force generation mechanism 41 side in the axial direction. An annular member 175, which is a component in common with the annular member 117, is provided on the side of the lid member 139 which is opposite to the damping force generation mechanism 41.

The case member main body 131, the disks 132, 133, 135, and 136, the annular member 175, and the lid member 139 are made of a metal. Each of the disks 132, 133, 135, and 136 and the annular member 175 has a perforated circular flat plate shape, having a fixed thickness, into which the mounting shaft portion 28 of the piston rod 21 can be fitted. Both the case member main body 131 and the lid member 139 have an annular shape into which the mounting shaft portion 28 of the piston rod 21 can be fitted.

The lid member 139 is fitted to the case member main body 131. The lid member 139 and the case member main body 131 constitute a tubular case member 140. The lid member 139 has a lidded cylindrical shape including a lid body portion 165 and a tubular portion 166. A through-hole 167 is formed in the lid body portion 165. The case member main body 131 is fitted to the tubular portion 166 of the lid member 139 to form the tubular case member 140.

The case member main body 131 includes a perforated disk-shaped base portion 141 expanding in a direction perpendicular to the axis, an inner cylindrical portion 142, having a cylindrical shape, which extends in the axial direction of the base portion 141 formed on the inner peripheral side of the base portion 141, and a cylindrical seat portion 143 protruding in the axial direction of the base portion 141 formed closer to the outer peripheral side than the inner cylindrical portion 142 of the base portion 141. The inner cylindrical portion 142 protrudes from the base portion 141 to both sides in the axial direction. The seat portion 143 protrudes from the base portion 141 only to one side in the axial direction.

On the inner side of the inner cylindrical portion 142, a small-diameter hole portion 145 for fitting the mounting shaft portion 28 of the piston rod 21 is formed on a side opposite to the protruding direction of the seat portion 143 in the axial direction. On the inner side of the inner cylindrical portion 142, a large-diameter hole portion 146 having a larger diameter than the small-diameter hole portion 145 is formed on the seat portion 143 side in the axial direction.

The seat portion 143 of the case member main body 131 supports the outer peripheral side of the partitioning disk 134 at the end on the protrusion tip side. In addition, a notch 144 is partially formed in the seat portion 143 in the circumferential direction. The radially inner side and the radially outer side of the seat portion 143 of the case member main body 131 communicate with each other at all times.

The disk 132 has an outer diameter smaller than the inner diameter of the seat portion 143. A notch 151 is formed on the inner peripheral side of the disk 132. The notch 151 radially crosses a portion of the inner cylindrical portion 142 which is in contact with the disk 132. The disk 133 has an outer diameter smaller than the outer diameter of the disk 132.

The partitioning disk 134 is constituted by a metal disk 155 and a rubber sealing member 156 which is fixed to the outer peripheral side of the disk 155. The partitioning disk 134 is elastically deformable.

The disk 155 has a perforated circular flat plate shape, having a fixed thickness, which can be disposed therein with a gap from the disk 133. The disk 155 is thinner than the total thickness of the plurality of disks 133. The disk 155 has an outer diameter larger than the outer diameter of the seat portion 143 of the case member main body 131.

The sealing member 156 is fixed to the outer peripheral side of the disk 155 in an annular shape. The sealing member 156 has an annular sealing body portion 158 that protrudes from the disk 155 toward the case member main body 131 side in the axial direction, and an annular protruding portion 159 that protrudes from the disk 155 to the side opposite to the case member main body 131 in the axial direction.

In addition, an annular gap is provided between the disk 155 and the tubular portion 166 of the lid member 139. The sealing member 156 connects the sealing body portion 158 and the protruding portion 159 through the gap. In the sealing body portion 158, the inner diameter of the end portion on the disk 155 side, that is, the minimum inner diameter, is slightly larger than the outer diameter of the seat portion 143. Thereby, the disk 155 of the partitioning disk 134 can be seated on the seat portion 143 of the case member main body 131.

A radial groove 161 is formed in the protruding portion 159 so as to open on a side opposite to the disk 155 and penetrate the protruding portion 159 in the radial direction.

The disk 135 has an outer diameter larger than the inner diameter of the disk 155 of the partitioning disk 134. Thereby, a portion of the partitioning disk 134 on the inner peripheral side is movably supported between the disk 132 and the disk 135 within the range of the axial length of the disk 133.

In addition, the annular sealing member 156 is provided on the outer peripheral side of the partitioning disk 134, which is a non-support side, to seal a gap between the annular sealing member 156 and the case member 140. The sealing member 156 contacts the case member 140, and the partitioning disk 134 is centered with respect to the case member 140. In other words, the inner peripheral side of the partitioning disk 134 has a simple support structure in which only one side is supported by the disk 135 without being clamped from both sides.

The outer diameter of each of the plurality of disks 136 is larger than the outer diameter of the disk 135. The plurality of disks 136 are in contact with a range inside the through-hole 167 in the radial direction of the lid body portion 165 of the lid member 139.

The sealing body portion 158 of the partitioning disk 134 is in contact with the inner peripheral surface of the tubular portion 166 of the lid member 139 over the entire circumference. The sealing body portion 158 seals a gap between the partitioning disk 134 and the tubular portion 166. That is, the partitioning disk 134 is a packing valve.

The sealing body portion 158 seals the gap between the partitioning disk 134 and the tubular portion 166 at all times even when the partitioning disk 134 is deformed in the case member 140 within an allowable range. The sealing body portion 158 of the partitioning disk 134 is in contact with the tubular portion 166 over the entire circumference, thereby being centered with respect to the case member 140 as described above. The partitioning disk 134 partitions the inside of the case member 140 into a variable chamber 171 of which the volume is variable on the case member main body 131 side and a variable chamber 172 of which the volume is variable on the lid body portion 165 side of the lid member 139. The variable chamber 171 communicates with the passage in the large-diameter hole portion 146 of the case member main body 131 through the passage in the notch 151 of the disk 132. The variable chamber 172 communicates with the lower chamber 20 through the passage in the through-hole 167 of the lid member 139.

A nut 176 is screwed onto the male screw 31 of the mounting shaft portion 28 of the piston rod 21. Thereby, the annular member 117, the damping force generation mechanism 42, the piston 18, the damping force generation mechanism 41, the frequency sensitive mechanism 43, and the annular member 175 are attached to the mounting shaft portion 28.

In the state of attachment to the piston rod 21 in this manner, the pilot chamber 80 communicates with the variable chamber 171 of the frequency sensitive mechanism 43 at all times through the passage in the notch 91 of the disk 54, the passage in the large-diameter hole portion 76 of the seat member 55, the passage in the passage groove 30 of the piston rod 21, the passage in the large-diameter hole portion 146 of the case member main body 131, and the passage in the notch 151 of the disk 132. In addition, the variable chamber 172 of the frequency sensitive mechanism 43 communicates with the lower chamber 20 through the through-hole 167 of the lid member 139 at all times. The passage in the through-hole 87, the pilot chamber 80, the passage in the notch 91, the passage in the large-diameter hole portion 76, the passage in the passage groove 30, the passage in the large-diameter hole portion 146, the passage in the notch 151, the variable chambers 171 and 172, and the passage in the through-hole 167 branch off from the extension-side first passage 101 described above. These passages constitute an extension-side second passage 181 provided in parallel with the first passage 101 after the branching.

The partitioning disk 134 is deformable within a range in which the inner peripheral side moves between the disks 132 and 135 and the outer peripheral side moves between the seat portion 143 and the lid body portion 165 of the lid member 139. Here, a shortest distance in the axial direction between the seat portion 143 supporting the outer peripheral side of the disk 155 of the partitioning disk 134 from one side in the axial direction and the disk 135 supporting the inner peripheral side of the disk 155 from the other side in the axial direction is smaller than the thickness of the disk 155 in the axial direction. Thus, when the variable chambers 171 and 172 have the same pressure, the disk 155 is slightly deformed and pressed against the seat portion 143 and the disk 135 over the entire circumference due to its own elastic force.

The partitioning disk 134 blocks the flow of an oil liquid between the variable chambers 171 and 172 of the second passage 181 in a state where the inner peripheral side of the partitioning disk 134 is in contact with the disk 135 over the entire inner circumference. The partitioning disk 134 is set such that its entire circumference is in contact with the disk 135 at all times, regardless of the pressure states of the variable chambers 171 and 172. The partitioning disk 134 blocks communication between the variable chambers 171 and 172 during an extension stroke, but allows communication therebetween during a contraction stroke.

Operations of the damping force generation mechanisms 41 and 42 and the frequency sensitive mechanism 43 provided around the piston 18 configured as described above are the same as in International Publication No. WO2017/047661.

Next, a configuration of the base valve 25 will be described with reference to FIGS. 4 to 9.

Figure 4:
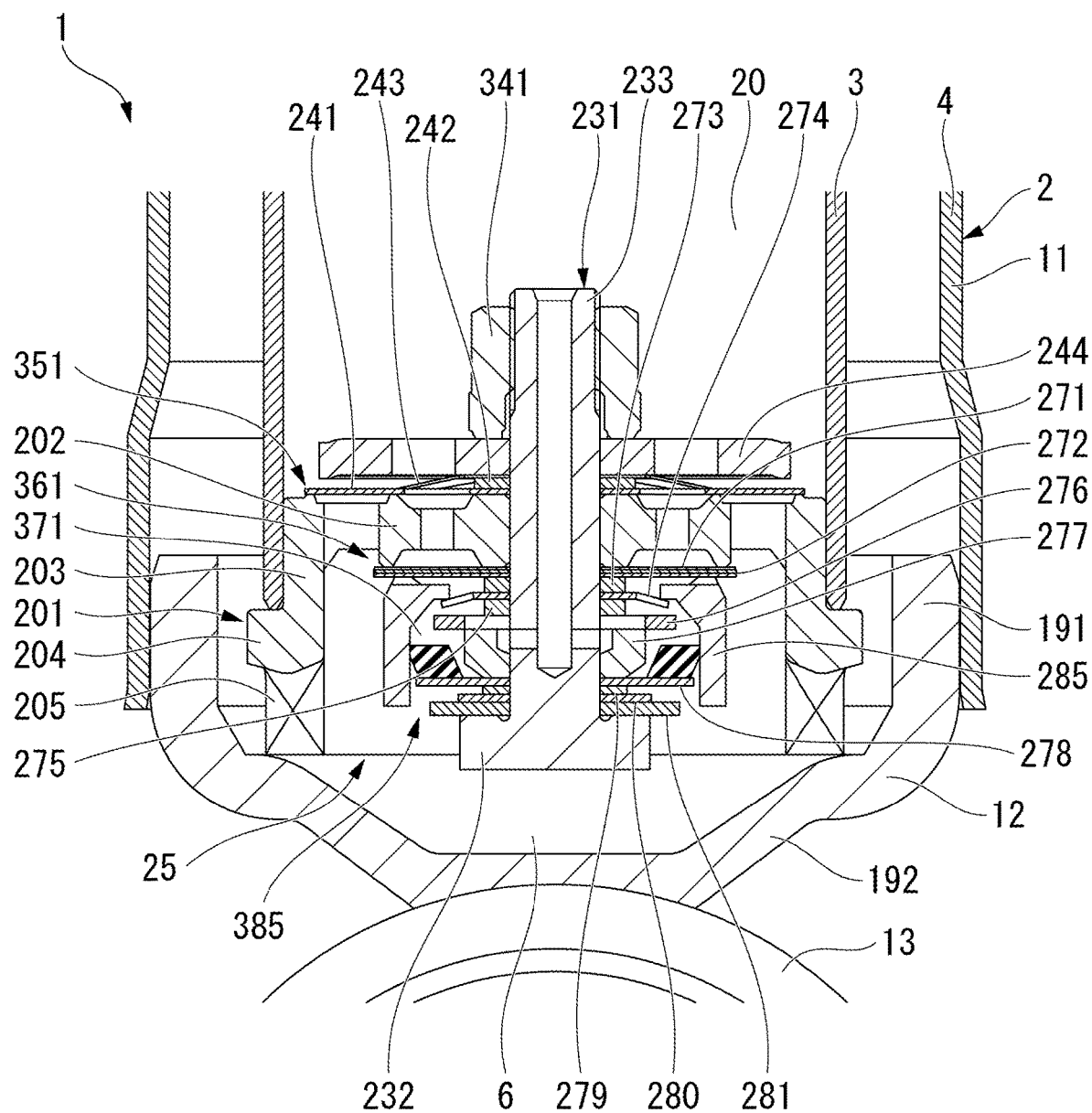
FIG. 4 is a cross-sectional view of the vicinity of a base valve illustrating the shock absorber according to the first embodiment of the present invention.

As illustrated in FIG. 4, the bottom member 12 of the outer cylinder 4 includes a cylindrical fitting portion 191 that is fitted to the body member 11, and a bottom portion 192 that closes one end side of the fitting portion 191 in the axial direction. The bottom portion 192 of the bottom member 12 is a bottom portion of the outer cylinder 4. The above-mentioned base valve 25 is provided between the bottom portion 192 of the outer cylinder 4 and the cylinder 3.

The base valve 25 includes a base valve member 201 that separates the lower chamber 20 and the reservoir chamber 6.

The base valve member 201 is an integrally molded product that is made of a metal and is seamlessly molded. The base valve member 201 includes a perforated disk-shaped base portion 202, a cylindrical leg portion 203 extending from the outer peripheral portion of the base portion 202 to one side in the axial direction, and a flange portion 204 that protrudes outward in the radial direction from an intermediate position of the leg portion 203 in the axial direction. A plurality of passage grooves 205 penetrating the leg portion 203 in the radial direction are formed at intervals in the circumferential direction at the end portion of the leg portion 203 which is opposite to the base portion 202 with respect to the flange portion 204 in the axial direction.

The base valve member 201 is a rigid body that is difficult to deform. The base valve member 201 is placed on the bottom portion 192 of the outer cylinder 4 at the end portion of the leg portion 203 which is opposite to the base portion 202 in the axial direction. In addition, the base valve member 201 is fitted to the cylinder 3 at the outer peripheral portions of the base portion 202 and a portion of the leg portion 203 which is closer to the base portion 202 than the flange portion 204 in the axial direction.

A space between the base valve member 201 and the bottom portion 192 is communicated with a space between the cylinder 3 and the outer cylinder 4 at all times by the passage groove 205 formed in the leg portion 203. Thus, a space between the base valve member 201 and the bottom portion 192 also constitutes the reservoir chamber 6.

Figure 5:
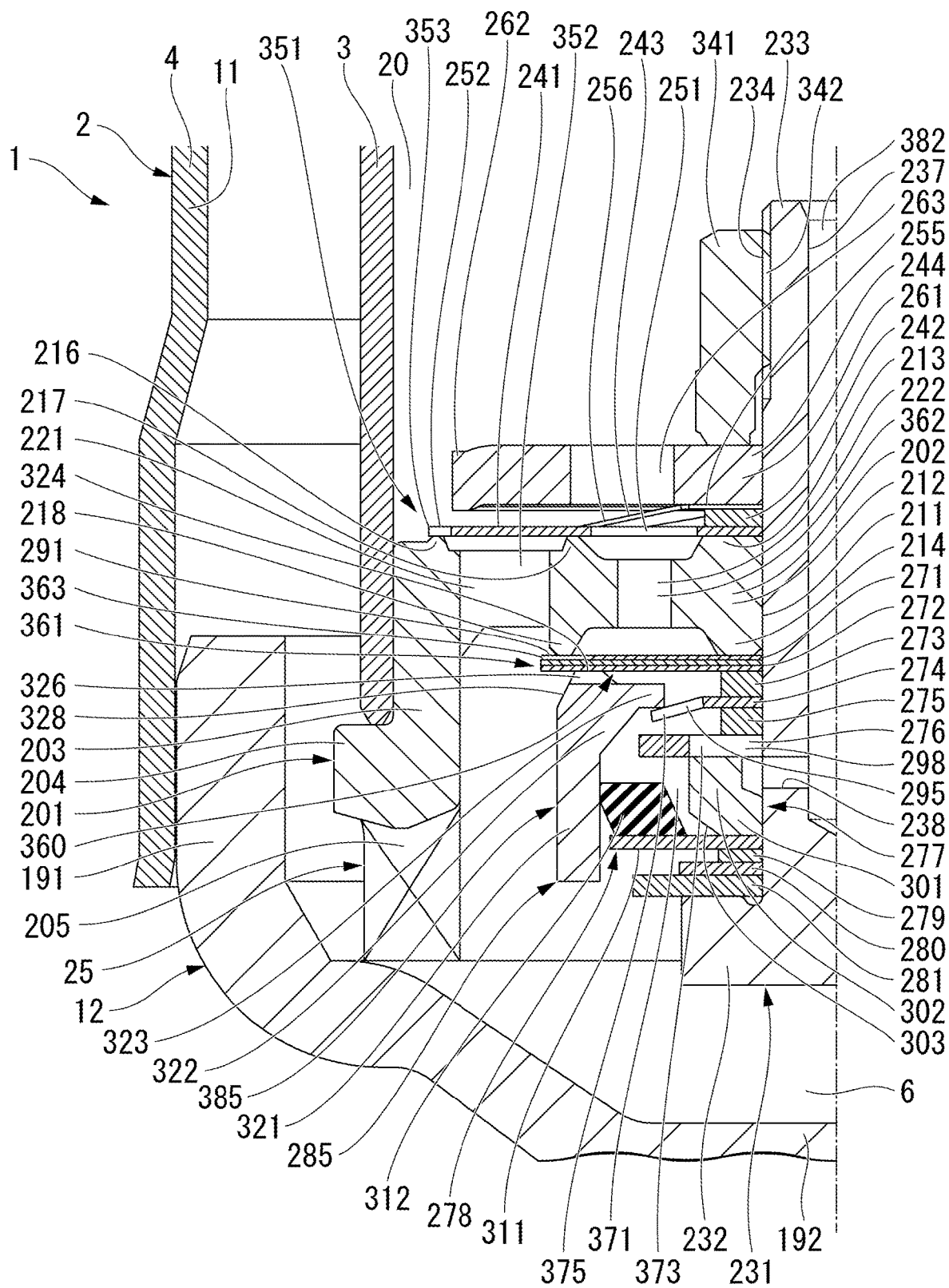
FIG. 5 is a cross-sectional view of one side of the vicinity of the base valve illustrating the shock absorber according to the first embodiment of the present invention.
Figure 6:
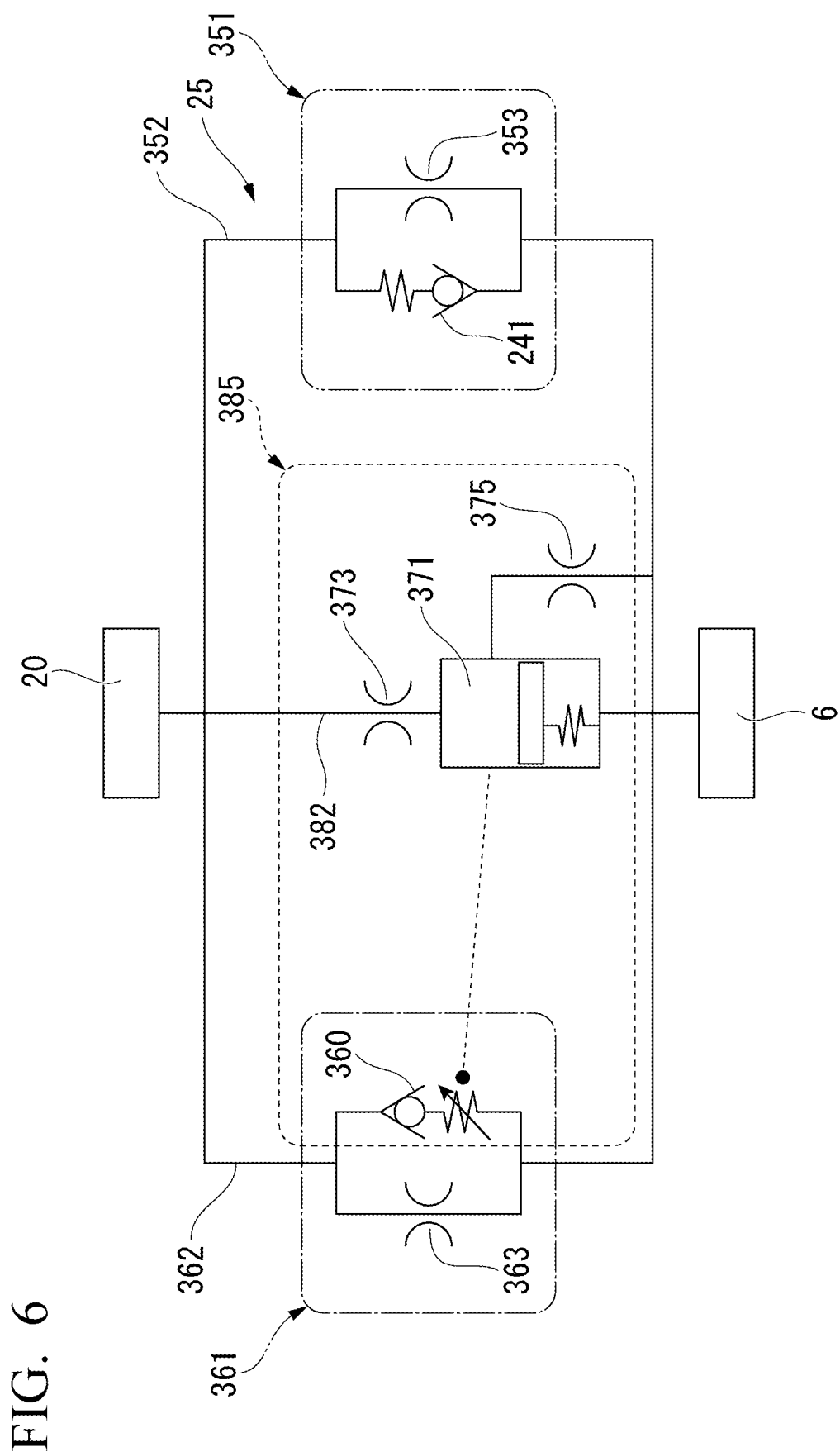
FIG. 6 is a hydraulic circuit diagram of the base valve illustrating the shock absorber according to the first embodiment of the present invention.

As illustrated in FIG. 5, a through-hole 211 is formed in the center of the base portion 202 of the base valve member 201 in the radial direction. The base portion 202 of the base valve member 201 includes a disk-shaped base body portion 212 that mainly constitutes the base portion 202, an annular upper inner seat portion 213 protruding on a side opposite to the leg portion 203 in the axial direction from the entire circumference of an edge portion of the base body portion 212 on the through-hole 211 side in the radial direction, and an annular lower inner seat portion 214 protruding on the leg portion 203 side in the axial direction from the entire circumference of the edge portion of the base body portion 212 on the through-hole 211 side in the radial direction. The inner side of the base body portion 212, the upper inner seat portion 213, and the lower inner seat portion 214 in the radial direction constitute the through-hole 211.

The base portion 202 of the base valve member 201 includes an annular upper outer seat portion 216 protruding on a side opposite to the leg portion 203 in the axial direction from a portion on the outer end side of the base body portion 212 in the radial direction, and an annular intermediate seat portion 217 protruding on a side opposite to the leg portion 203 in the axial direction from a position between the upper outer seat portion 216 and the upper inner seat portion 213 in the radial direction of the base body portion 212. In addition, the base portion 202 also includes an annular lower outer seat portion 218 protruding on the leg portion 203 side in the axial direction from a position between the leg portion 203 and the lower inner seat portion 214 in the radial direction of the base body portion 212.

In the base body portion 212, an outer passage hole 221 penetrating the base body portion 212 in the axial direction is formed between the upper outer seat portion 216 and the intermediate seat portion 217 in the radial direction. A plurality of outer passage holes 221 are formed at intervals in the circumferential direction of the base body portion 212. The plurality of outer passage holes 221 are disposed between the lower outer seat portion 218 and the leg portion 203 in the radial direction of the base body portion 212. The lower chamber 20 and the reservoir chamber 6 can communicate with each other by the plurality of outer passage holes 221.

In the base body portion 212, an inner passage hole 222 penetrating the base body portion 212 in the axial direction is formed between the upper inner seat portion 213 and the intermediate seat portion 217 in the radial direction. A plurality of inner passage holes 222 are formed at intervals in the circumferential direction of the base body portion 212. The plurality of inner passage holes 222 are disposed between the lower outer seat portion 218 and the lower inner seat portion 214 in the radial direction of the base body portion 212. The lower chamber 20 and the reservoir chamber 6 can communicate with each other by the plurality of inner passage holes 222.

The base valve 25 includes a shaft-shaped pin member 231 (shaft member) inserted into the through-hole 211 of the base valve member 201. The pin member 231 is a hollow bolt. The pin member 231 includes a head 232 that can engage with a fastening tool, and a columnar shaft portion 233 that extends from the center of the head 232 in the radial direction and has a diameter smaller than the minimum outer diameter of the head 232.

A male screw 234 is formed on the outer peripheral portion of the shaft portion 233 on a side opposite to the head 232 in the axial direction. An axial passage hole 237 is formed in the shaft portion 233 from an end face opposite to the head 232 to a predetermined position in the vicinity of the head 232. The axial passage hole 237 is formed in the center of the shaft portion 233 in the radial direction so as to extend in the axial direction of the shaft portion 233.

In addition, a radial passage hole 238 penetrating the shaft portion 233 in the radial direction is formed in the shaft portion 233 at a predetermined position in the vicinity of the head 232. The radial passage hole 238 is perpendicular to the axial passage hole 237 and communicates with the axial passage hole 237.

The base valve 25 includes one suction valve 241, one disk 242, one spring disk 243, and one regulation disk 244 on the side of the base valve member 201 which is opposite to the bottom portion 192 in the axial direction in order from the base valve member 201 side in the axial direction. The suction valve 241, the disk 242, the spring disk 243, and the regulation disk 244 are all made of a metal. Both the suction valve 241 and the disk 242 have a perforated circular flat plate shape, having a fixed thickness, into which the shaft portion 233 of the pin member 231 can be fitted.

The suction valve 241 has an outer diameter slightly larger than the outer diameter of the upper outer seat portion 216 of the base valve member 201. The suction valve 241 is bendable and abuts on the upper inner seat portion 213, the upper outer seat portion 216, and the intermediate seat portion 217 to close the outer passage hole 221. A passage hole 251 penetrating the suction valve 241 in the axial direction is formed between the upper inner seat portion 213 and the intermediate seat portion 217 in the radial direction in the suction valve 241. A plurality of passage holes 251 are formed in the suction valve 241 at equal intervals in the circumferential direction of the suction valve 241. A notch 252 is formed on the outer peripheral side of the suction valve 241. The notch 252 radially crosses a portion of the upper outer seat portion 216 which is in contact with the suction valve 241.

In the disk 242, the entire disk 242 having an outer diameter equal to the outer diameter of the upper inner seat portion 213 of the base valve member 201 is disposed on the inner side of the passage hole 251 in the radial direction of the suction valve 241.

The spring disk 243 includes a perforated circular plate-shaped substrate portion 255, having a fixed thickness, into which the shaft portion 233 of the pin member 231 can be fitted and a spring plate portion 256 that extends outward in the radial direction from the outer peripheral edge portion of the substrate portion 255.

The spring plate portion 256 is bendable, and a plurality of spring plate portions 256 are formed at equal intervals in the circumferential direction of the substrate portion 255. The substrate portion 255 has an outer diameter slightly larger than the outer diameter of the disk 242. The spring plate portion 256 is inclined with respect to the substrate portion 255 so as to separate from the substrate portion 255 in the axial direction of the substrate portion 255 outward in the radial direction of the substrate portion 255. All of the plurality of spring plate portions 256 extend to the same side of the substrate portion 255 in the axial direction of the substrate portion 255.

The spring disk 243 abuts on the disk 242 at the substrate portion 255. A plurality of spring plate portions 256 of the spring disk 243 extend from the substrate portion 255 toward the suction valve 241 in the axial direction and abut on the suction valve 241 outside the passage hole 251 in the radial direction.

The regulation disk 244 has a thickness and rigidity larger than those of the suction valve 241 and the spring disk 243. The regulation disk 244 includes a perforated circular plate-shaped main plate portion 261, having a fixed thickness, into which the shaft portion 233 of the pin member 231 can be fitted, and an annular outer peripheral plate portion 262 that extends outward in the radial direction from the entire outer circumference of the main plate portion 261.

The outer peripheral plate portion 262 is formed to be slightly shifted to one side in the axial direction with respect to the main plate portion 261. The regulation disk 244 abuts on the substrate portion 255 of the spring disk 243 at the main plate portion 261. The outer peripheral plate portion 262 protrudes from the main plate portion 261 toward the suction valve 241 in the axial direction.

In the main plate portion 261, a passage hole 263 penetrating the main plate portion 261 in the axial direction is formed at a predetermined intermediate position in the radial direction. A plurality of passage holes 263 are formed in the main plate portion 261 at equal intervals in the circumferential direction of the main plate portion 261. The passage hole 263 makes the lower chamber 20 communicate with the inner passage hole 222 of the base valve member 201 at all times through gaps between the spring plate portions 256 of the spring disk 243 and the passage holes 251 of the suction valve 241.

The base valve 25 includes one disk 271 and a plurality of disks, specifically, two disks 272, one disk 273, one biasing disk 274, one disk 275, one disk 276, one spacer 277, one partitioning disk 278 (closing member), one disk 279, one disk 280, and one stopper disk 281 in order from the base portion 202 side in the axial direction on the bottom portion 192 side in the axial direction of the base portion 202 of the base valve member 201.

In addition, the base valve 25 includes a tubular spool member 285 on the side of the disk 272 which is opposite to the disk 271 in the axial direction. The spool member 285 is provided to surround the disks 273, 275, 276, 279, and 280, the biasing disk 274, the spacer 277, the partitioning disk 278, and the stopper disk 281 on the outer side in the radial direction.

The disks 271 to 273, 275, 276, 279, and 280, the biasing disk 274, the spacer 277, the stopper disk 281, and the spool member 285 are all made of a metal. Each of the disks 271 to 273, 275, 276, 279, and 280 and the stopper disk 281 has a perforated circular flat plate shape, having a fixed thickness, into which the shaft portion 233 of the pin member 231 can be fitted. The biasing disk 274, the spacer 277, and the partitioning disk 278 all have an annular shape into which the shaft portion 233 of the pin member 231 can be fitted.

The disk 271 has an outer diameter slightly larger than the outer diameter of the lower outer seat portion 218 of the base valve member 201. The disk 271 is bendable. The disk 271 abuts on the lower inner seat portion 214 and the lower outer seat portion 218 to close the inner passage hole 222.

A notch 291 is formed on the outer peripheral side of the disk 271. The notch 291 radially crosses a portion of the lower outer seat portion 218 which is in contact with the disk 271. A plurality of notches 291 are formed at equal intervals in the radial direction of the disk 271.

The disk 272 has the same outer diameter as that of the disk 271 and is bendable. The disk 273 has an outer diameter slightly smaller than the outer diameter of the lower inner seat portion 214 of the base valve member 201. The biasing disk 274 is flexible. The biasing disk 274 has a perforated circular flat plate shape in its natural state before assembly.

A notch 295 is formed on the outer peripheral side of the biasing disk 274. A plurality of notches 295 are formed at equal intervals in the circumferential direction of the biasing disk 274. The disk 275 is a component which is in common with the disk 273.

The disk 276 has an outer diameter larger than the outer diameter of the disk 275. A notch 298 is formed on the inner peripheral side of the disk 276. The notch 298 extends to the outside of the outer peripheral portion of the disk 275 in the radial direction of the disk 276. A plurality of notches 298 are formed at equal intervals in the circumferential direction of the disk 276.

The spacer 277 is a rigid body that is difficult to deform. The spacer 277 includes an annular bottom portion 301 into which the shaft portion 233 of the pin member 231 can be fitted, and a tubular portion 302, having a cylindrical shape, which extends from the outer peripheral edge portion of the bottom portion 301 to one side of the bottom portion 301 in the axial direction.

The spacer 277 abuts on the disk 276 at an end portion on the side of the tubular portion 302 which is opposite to the bottom portion 301 in the axial direction. In the spacer 277, a chamfer 303 is formed on the side of the outer peripheral portion of the bottom portion 301 which is opposite to the tubular portion 302 in the axial direction. The chamfer 303 has a tapered shape in which the outer diameter thereof becomes smaller toward a side opposite to the tubular portion 302 in the axial direction.

The partitioning disk 278 includes a metal disk 311 and a rubber sealing member 312 fixed to the outer peripheral side of the disk 311. The partitioning disk 278 is elastically deformable.

The sealing member 312 is integrated with the disk 311 by baking. The shaft portion 233 of the pin member 231 can be fitted into the disk 311. The disk 311 has a perforated circular flat plate shape having a fixed thickness. The disk 311 has an outer diameter larger than the maximum outer diameter of the spacer 277.

The sealing member 312 is fixed to the outer peripheral side of the disk 311 in an annular shape. The sealing member 312 protrudes from the disk 311 to one side in the axial direction. The sealing member 312 has an outer diameter that increases as the distance from the disk 311 increases in the axial direction, and an inner diameter that increases as the distance from the disk 311 increases in the axial direction.

The partitioning disk 278 abuts on the spacer 277 in the disk 311. The sealing member 312 extends from the disk 311 toward the spacer 277 in the axial direction.

The sealing member 312 has a gap between the sealing member 312 and the spacer 277 in the radial direction and surrounds the spacer 277 on the outer side in the radial direction. The length of the sealing member 312 in the axial direction is shorter than the length of the spacer 277 in the axial direction. Thus, the sealing member 312 is separated from the disk 276 in the axial direction.

The disk 279 has an outer diameter smaller than the outer diameter of the disk 311. The disk 280 has an outer diameter larger than the outer diameter of the disk 279. The stopper disk 281 has an outer diameter larger than the outer diameter of the disk 280 and smaller than the outer diameter of the disk 311.

The spool member 285 is a rigid body that is difficult to deform. The spool member 285 includes a tubular portion 321 having a cylindrical shape, an annular portion 322 having an annular shape and extending inward in the radial direction and extending outward in the axial direction from one end portion of the tubular portion 321 in the axial direction, an inner flange portion 323 extending inward in the radial direction from the inner peripheral portion of the annular portion 322 on a side opposite to the tubular portion 321 in the axial direction, and an annular pressing portion 324 protruding outward in the axial direction from the outer peripheral side of the end portion of the annular portion 322 on a side opposite to the tubular portion 321 in the axial direction.

The inner diameter of the tubular portion 321 is slightly larger than the outer diameter of the disk 311 of the partitioning disk 278. The inner diameter of the annular portion 322 decreases as the distance from the tubular portion 321 increases in the axial direction.

The inner flange portion 323 has a perforated circular flat plate shape. The inner diameter of the inner flange portion 323 is smaller than the outer diameter of the biasing disk 274 and larger than the outer diameter of the disk 273.

A notch 326 that crosses the pressing portion 324 in the radial direction is formed in the pressing portion 324. A plurality of notches 326 are formed at equal intervals in the circumferential direction of the pressing portion 324. A chamfer 328 is formed in the outer peripheral portion of the spool member 285 from the annular portion 322 to the pressing portion 324. The chamfer 328 has a tapered shape in which the outer diameter thereof decreases toward a side opposite to the tubular portion 321 in the axial direction.

The shaft portion 233 of the pin members 231 is inserted into each of the base valves 25. In the base valve 25, the stopper disk 281, the disk 280, the disk 279, the partitioning disk 278, the spacer 277, the disk 276, the disk 275, the biasing disk 274, and the disk 273 are superimposed on the head 232 in this order.

At this time, the partitioning disk 278 is oriented such that the sealing member 312 protrudes from the disk 311 to a side opposite to the head 232 in the axial direction. The spacer 277 is oriented such that the tubular portion 302 protrudes from the bottom portion 301 to a side opposite to the head 232 in the axial direction.

Then, the partitioning disk 278, the spacer 277, the disk 276, the disk 275, the biasing disk 274, and the disk 273 are inserted into the spool member 285 so as to be covered therewith. At this time, the spool member 285 is oriented such that the pressing portion 324 protrudes to a side opposite to the head 232 in the axial direction.

Since the inner diameter of the inner flange portion 323 is smaller than the outer diameter of the biasing disk 274, the spool member 285 abuts on the biasing disk 274 in the inner flange portion 323. In this state, the sealing member 312 of the partitioning disk 278 is fitted to the tubular portion 321 of the spool member 285 and abuts on the inner peripheral surface of the tubular portion 321 over the entire circumference. Thereby, the spool member 285 is centered with respect to the partitioning disk 278 and is centered with respect to the shaft portion 233 of the pin member 231.

Next, the plurality of disks 272 and 271, the base valve member 201, the suction valve 241, the disk 242, the spring disk 243, and the regulation disk 244 are superimposed in this order on the disk 273 and the spool member 285 while inserting the shaft portion 233 of the pin member 231 into each of those components.

At this time, the base valve member 201 is oriented such that the leg portion 203 protrudes from the base portion 202 toward the head 232 in the axial direction. The spring disk 243 is oriented such that the spring plate portion 256 protrudes from the substrate portion 255 toward the head 232 in the axial direction. The regulation disk 244 is oriented such that the outer peripheral plate portion 262 protrudes from the main plate portion 261 toward the head 232 in the axial direction.

Then, in this state, a nut 341 is screwed onto a female screw 342 to the male screw 234 of the shaft portion 233 of the pin member 231 protruding from the regulation disk 244 to a side opposite to the head 232 in the axial direction. By fastening the nut 341 to the pin member 231, the stopper disk 281, the disk 280, the disk 279, the partitioning disk 278, the spacer 277, the disk 276, the disk 275, the biasing disk 274, the disk 273, the plurality of disks 272, the disk 271, the base valve member 201, the suction valve 241, the disk 242, the spring disk 243, and the regulation disk 244 are clamped in the axial direction at least on the inner peripheral side by the head 232 and the nut 341.

At this time, the spool member 285 abuts on the disk 272 at the pressing portion 324, and the side of the inner flange portion 323 in the axial direction which is opposite to the pressing portion 324 abuts on the biasing disk 274. By fastening the nut 341 to the pin member 231, the spool member 285 is pressed by the base valve member 201 and the disks 271 and 272 so that the inner flange portion 323 elastically deforms the outer peripheral side of the biasing disk 274 toward the head 232 in the axial direction. As a result, the spool member 285 is pressed against the biasing disk 274 in the direction of the disks 271 and 272 by a biasing force.

Note that the size of the notch 295 of the biasing disk 274 is set such that the notch 295 is not blocked by the inner flange portion 323 on which the biasing disk 274 abuts. In this state, the pin member 231 is inserted into the disk 271, the plurality of disks 272, the spool member 285, the partitioning disk 278, and the like.

The base valve 25 configured in this manner is assembled between the cylinder 3 and the bottom portion 192 of the outer cylinder 4 as described above. Then, the base valve 25 provided on the bottom portion 192 of the outer cylinder 4 separates the reservoir chamber 6 between the outer cylinder 4 and the cylinder 3 and one lower chamber 20 inside the cylinder 3.

In this state, the suction valve 241 is disposed on the lower chamber 20 side of the base valve member 201 in the base valve 25. The disk 271 and the plurality of disks 272 are disposed on the reservoir chamber 6 side of the base valve member 201.

In the base valve 25, the suction valve 241, and the intermediate seat portion 217 and the upper outer seat portion 216 on which the suction valve 241 abuts constitute a suction valve mechanism 351 that allows an oil liquid to flow from the reservoir chamber 6 to the lower chamber 20 through the outer passage hole 221 and suppresses the flow of an oil liquid from the lower chamber 20 to the reservoir chamber 6 through the outer passage hole 221.

The passage in the outer passage hole 221 and the passage between the suction valve 241 and the upper outer seat portion 216 which is generated when the suction valve mechanism 351 is opened constitute a first passage 352 on the extension side through which an oil liquid flows out from the reservoir chamber 6 toward the lower chamber 20 due to the movement of the piston 18 during an extension stroke. Thus, the first passage 352 is provided in the base valve 25.

The suction valve mechanism 351 is provided in this first passage 352. The suction valve mechanism 351 is opened during the extension stroke of the shock absorber 1 to allow an oil liquid to flow from the reservoir chamber 6 into the lower chamber 20.

Note that the suction valve mechanism 351 functions to flow a liquid from the reservoir chamber 6 to the lower chamber 20 without substantially generating a damping force so as to compensate for the shortage of a liquid caused mainly by the extension of the piston rod 21 from the cylinder member 2. Note that a damping force may be generated by the suction valve mechanism 351.

A passage in the notch 252 of the suction valve 241 constitutes a fixed orifice 353 that makes the reservoir chamber 6 and the lower chamber 20 communicate with each other at all times even when the suction valve 241 abuts on the intermediate seat portion 217 and the upper outer seat portion 216. The fixed orifice 353 is also provided in the first passage 352.

The disk 271 and the plurality of disks 272 constitute a main valve 360 (disk) that opens and closes the inner passage hole 222. The main valve 360 and the lower outer seat portion 218 on which the main valve 360 abuts constitute a damping force generation mechanism 361 that allows an oil liquid to flow from the lower chamber 20 to the reservoir chamber 6 through the passage hole 251 and the inner passage hole 222 of the suction valve 241 and suppresses the flow of an oil liquid from the reservoir chamber 6 to the lower chamber 20 through the inner passage hole 222.

The passages of the passage hole 251 and the inner passage hole 222, and the passage between the main valve 360 and the lower outer seat portion 218 which is generated when the damping force generation mechanism 361 is opened constitute a contraction-side first passage 362 through which an oil liquid flows out from the lower chamber 20 toward the reservoir chamber 6 due to the movement of the piston 18 during a contraction stroke. Thus, the first passage 362 is provided in the base valve 25.

The damping force generation mechanism 361 is provided in the first passage 362. The damping force generation mechanism 361 is opened during a contraction stroke of the shock absorber 1 to allow an oil liquid to flow from the lower chamber 20 to the reservoir chamber 6 and generate a damping force. In the damping force generation mechanism 361, the main valve 360 provided in the first passage 362 generates a damping force. The passage in the notch 291 of the disk 271 constitutes a fixed orifice 363 that allows the lower chamber 20 and the reservoir chamber 6 to communicate with each other at all times even when the main valve 360 abuts on the lower outer seat portion 218. The fixed orifice 363 is also provided in the first passage 362.

The axial passage hole 237 of the pin member 231 opens to the lower chamber 20. Thus, the axial passage hole 237 and the radial passage hole 238 communicate with the lower chamber 20 at all times.

The radial passage hole 238 is aligned with the tubular portion 302 of the spacer 277 in the axial direction of the pin member 231 and faces the tubular portion 302 in the radial direction. A passage further inside the tubular portion 302 of the spacer 277 in the radial direction communicates with a passage in the radial passage hole 238 at all times. In addition, the passage of the spacer 277 communicates with the passage in the notch 298 of the disk 276 at all times.

A range surrounded by the spool member 285, the partitioning disk 278, the spacer 277, the disk 276, the disk 275, and the biasing disk 274 is a pilot chamber 371. The pilot chamber 371 is located on the inner peripheral side of the spool member 285. A passage in the notch 326 of the disk 276 serves as an orifice 373 that introduces an oil liquid in the lower chamber 20 into the pilot chamber 371 through the axial passage hole 237 and the radial passage hole 238. The pilot chamber 371 applies fluid pressure in the lower chamber 20, which is introduced through the orifice 373, to the spool member 285.

At this time, the pilot chamber 371 applies a biasing force to the spool member 285 in a direction in which the main valve 360 abuts on the lower outer seat portion 218. In other words, the tubular spool member 285 moves in the axial direction in accordance with the pilot pressure in the pilot chamber 371, thereby changing the biasing force applied to the main valve 360 in a closing direction. The pilot chamber 371 generates a biasing force against the main valve 360 in the spool member 285.

The partitioning disk 278 is in contact with the spool member 285 at all times and closes a gap between the partitioning disk 278 and the spool member 285. The partitioning disk 278 blocks communication between the pilot chamber 371 and the reservoir chamber 6 through the gap at all times. When the partitioning disk 278 is deformed, the volume of the pilot chamber 371 changes. The partitioning disk 278 receives the internal pressure of the pilot chamber 371 and bends in a direction in which the pilot chamber 371 expands.

When the partitioning disk 278 is deformed by a predetermined amount in a direction in which the volume of the pilot chamber 371 is enlarged, the stopper disk 281 abuts on the disk 311 of the partitioning disk 278 to regulate further deformation of the partitioning disk 278.

The passage in the notch 295 of the biasing disk 274 serves as an orifice 375 that allows the pilot chamber 371 to communicate with the reservoir chamber 6 through the passage between the disks 273 and 272 and the inner flange portion 323 of the spool member 285 and the passage in the notch 326 of the spool member 285.

Here, the partitioning disk 278 receives the internal pressure of the pilot chamber 371 and bends in a direction in which the pilot chamber 371 expands during a contraction stroke. Thus, in the contraction stroke, regarding a relationship between a flow channel cross-sectional area of the orifice 373 on an introduction side of the pilot chamber 371 and a flow channel cross-sectional area of the orifice 375 on a discharge side, the flow channel cross-sectional area of the orifice 373 is larger than the flow channel cross-sectional area of the orifice 375 by a predetermined value or more.

When the flow channel cross-sectional area of the orifice 373 is equal to or less than the flow channel cross-sectional area of the orifice 375, the pilot pressure in the pilot chamber 371 does not rise. In addition, even when the flow channel cross-sectional area of the orifice 373 is larger than the flow channel cross-sectional area of the orifice 375, and when the difference is less than a predetermined value, the pilot pressure in the pilot chamber 371 does not sufficiently rise. A predetermined value is set such that the pilot pressure in the pilot chamber 371 sufficiently rises.

The passages in the axial passage hole 237 and the radial passage hole 238 of the pin member 231, the passage in the spacer 277, the orifice 373 of the disk 276, the pilot chamber 371, the orifice 375 of the biasing disk 274, the passage between the disk 273, the disk 272, and the inner flange portion 323 of the spool member 285, and the passage in the notch 326 of the spool member 285 constitute a second passage 382.

The second passage 382 introduces an oil liquid, which has entered the axial passage hole 237 of the pin member 231 from the lower chamber 20, into the pilot chamber 371 through the orifice 373 during a contraction stroke. Further, in the contraction stroke, the second passage 382 discharges an oil liquid from the pilot chamber 371 through the orifice 375 and allows the oil liquid to flow to the reservoir chamber 6 through the passage in the notch 326 of the spool member 285.

The second passage 382 is provided in parallel with the first passages 352 and 362 to allow the lower chamber 20 and the reservoir chamber 6 to communicate with each other. The second passage 382 is provided in the base valve 25 and is partially formed in the pin member 231.

The spool member 285, the partitioning disk 278, the spacer 277, the disks 273, 275, and 276, and the biasing disk 274 constitute a pressure control type frequency sensitive mechanism 385 that adjusts a damping force of the damping force generation mechanism 361 by the pressure in the pilot chamber 371. The frequency sensitive mechanism 385 is provided in the second passage 382.

The frequency sensitive mechanism 385 makes the spool member 285 abut on the main valve 360 that opens and closes the first passage 362 to adjust an injection-valve opening pressure of the main valve 360. The frequency sensitive mechanism 385 makes the damping force of the damping force generation mechanism 361 variable in accordance with a piston frequency which is the frequency of the piston 18. The frequency sensitive mechanism 385 is provided between the base portion 202 of the base valve 25 and the head 232 at one end of the pin member 231. The frequency sensitive mechanism 385 is provided on the bottom portion 192 side of the base valve 25.

The partitioning disk 278 of the frequency sensitive mechanism 385 blocks the flow of an oil liquid from the lower chamber 20 to the reservoir chamber 6 through the spool member 285. The partitioning disk 278 is provided to be movable with respect to the spool member 285. The partitioning disk 278 is a packing valve having the sealing member 312 on the outer peripheral side thereof, the sealing member 312 being slidably in close contact with the tubular portion 321 of the spool member 285. In the partitioning disk 278, the sealing member 312 is provided on the disk 311 by baking.

Note that the partitioning disk 278 may be configured as follows instead of being configured as the packing valve. That is, the partitioning disk 278 may be changed to a component that is slidably in close contact with the tubular portion 321 by having an O-ring as a sealing member at a portion in contact with the tubular portion 321. The partitioning disk 278 may be changed to a component having a deformable diaphragm as a sealing member that closes a gap between the partitioning disk 278 and the tubular portion 321.

A hydraulic circuit diagram of the base valve 25 described above is illustrated in FIG. 6.

The suction valve mechanism 351 including the suction valve 241 and the fixed orifice 353 is provided in the extension-side first passage 352 that allows the reservoir chamber 6 and the lower chamber 20 to communicate with each other. The damping force generation mechanism 361 including the main valve 360 and the fixed orifice 363 is provided in the contraction-side first passage 362 that allows the lower chamber 20 and the reservoir chamber 6 to communicate with each other. The frequency sensitive mechanism 385 is provided in the second passage 382 provided in parallel with the first passages 352 and 362.

The frequency sensitive mechanism 385 includes the orifices 373 and 375 and the pilot chamber 371. The frequency sensitive mechanism 385 applies a force corresponding to the pressure in the pilot chamber 371 to the main valve 360 in a closing direction.

Next, operations of the base valve 25 will be described.

During a contraction stroke in which the piston rod 21 moves toward a contraction side, when only the damping force generation mechanism 361 on the contraction side acts, and when the moving speed of the piston 18 (hereinafter referred to as a piston speed) is low, an oil liquid from the lower chamber 20 manly flow into the reservoir chamber 6 through the fixed orifice 363 of the first passage 362. That is, the oil liquid from the lower chamber 20 flows into the reservoir chamber 6 through the passage in the passage hole 251 of the suction valve 241, the passage in the inner passage hole 222 of the base valve member 201, and the fixed orifice 363 of the main valve 360. For this reason, a damping force is generated based on the orifice characteristics (the damping force is substantially proportional to the square of the piston speed). Thus, the characteristics of the damping force with respect to the piston speed when the piston speed is in a low speed range show that the rate of increase in the damping force is relatively high with respect to an increase in the piston speed.

In addition, when the piston speed increases, the oil liquid from the lower chamber 20 opens the damping force generation mechanism 361 of the first passage 362 and flows into the reservoir chamber 6. That is, the oil liquid from the lower chamber 20 flows into the reservoir chamber 6 through the passage in the passage hole 251 of the suction valve 241, the passage in the inner passage hole 222 of the base valve member 201, and a gap between the deformed main valve 360 and the lower outer seat portion 218 of the base valve member 201.

Thus, a damping force is generated based on the valve characteristics (the damping force is substantially proportional to the piston speed). Thus, the characteristics of the damping force with respect to the piston speed when the piston speed is in a medium and high speed range show that the rate of increase in the damping force with respect to an increase in the piston speed is slightly lower than that in the low speed range.

During an extension stroke in which the piston rod 21 moves toward an extension side, when the piston speed is low, the oil liquid from the reservoir chamber 6 mainly flows into the lower chamber 20 through the fixed orifice 353 of the first passage 352 on the extension side. That is, the oil liquid from the reservoir chamber 6 flows into the lower chamber 20 through the passage in the outer passage hole 221 of the base valve member 201 and the fixed orifice 353 of the suction valve 241.

For this reason, a damping force is generated based on the orifice characteristics (the damping force is substantially proportional to the square of the piston speed). The characteristics of the damping force with respect to the piston speed when the piston speed is in a low speed range show that the rate of increase in the damping force is relatively high with respect to an increase in the piston speed.

In addition, when the piston speed increases, the oil liquid from the reservoir chamber 6 opens the suction valve mechanism 351 of the first passage 352 on the extension side and flows into the lower chamber 20. That is, the oil liquid from the reservoir chamber 6 flows into the lower chamber 20 through the passage in the outer passage hole 221 of the base valve member 201 and a gap between the suction valve 241 and the upper outer seat portion 216 of the base valve member 201. For this reason, a damping force is generated based on the valve characteristics (the damping force is substantially proportional to the piston speed). Thus, the characteristics of the damping force with respect to the piston speed when the piston speed is in a medium and high speed range show that the rate of increase in the damping force with respect to an increase in the piston speed is slightly lower than that in the low speed range.

The above is an operation of the base valve 25 when only the suction valve mechanism 351 and the damping force generation mechanism 361 act. In the first embodiment, the frequency sensitive mechanism 385 varies a damping force in accordance with a piston frequency even when the piston speed is the same.

Figure 7:
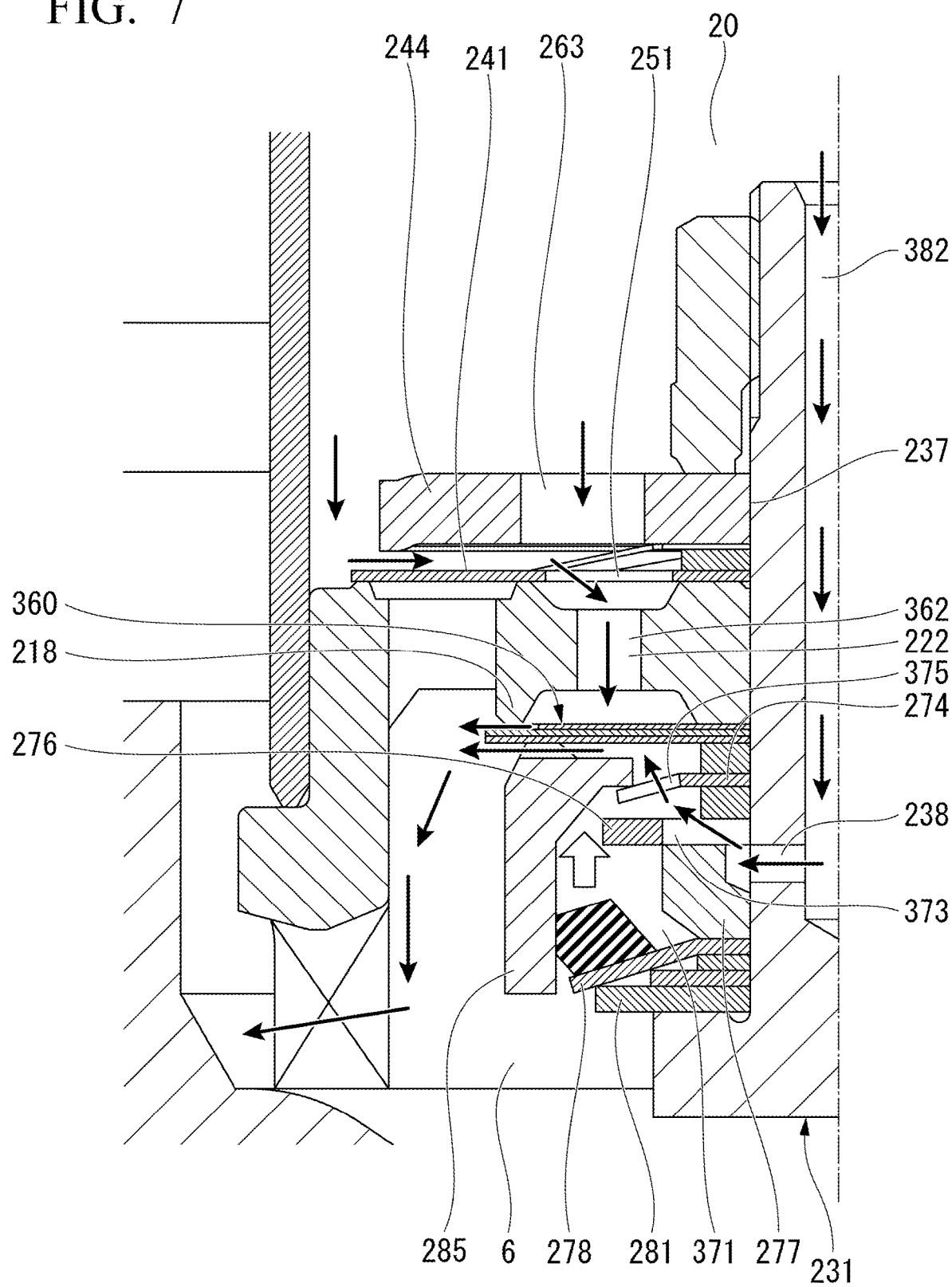
FIG. 7 is a diagram illustrating operations of the vicinity of the base valve illustrating the shock absorber according to the first embodiment of the present invention.

That is, in a contraction stroke when the piston frequency is low, the pressure in the lower chamber 20 increases, and the oil liquid in the lower chamber 20 is introduced into the first passage 362 and flows into the reservoir chamber 6 as indicated by an arrow in FIG. 7. That is, the oil liquid flows into the reservoir chamber 6 through the passage in the passage hole 251 of suction valve 241, the passage in the inner passage hole 222, and a gap between the main valve 360 and the lower outer seat portion 218.

In addition, the oil liquid in the lower chamber 20 is introduced into the second passage 382 and introduced into the pilot chamber 371 in the middle. That is, the oil liquid is introduced into the pilot chamber 371 through the passages in the axial passage hole 237 and the radial passage hole 238 of the pin member 231, the passage in the spacer 277, and the orifice 373 in the disk 276. The oil liquid flows into the reservoir chamber 6 through the orifice 375 in the biasing disk 274 from the pilot chamber 371.

At this time, the flow channel cross-sectional area of the orifice 375 is smaller than the flow channel cross-sectional area of the orifice 373, and the volume of the oil liquid introduced into the pilot chamber 371 is also large. For this reason, the volume of the oil liquid stored in the pilot chamber 371 increases. Thus, at the initial stage when an oil liquid is introduced into the pilot chamber 371 from the lower chamber 20, the partitioning disk 278 is greatly bent and abuts on the stopper disk 281 as illustrated in FIG. 7, and further deformation is regulated. Thereby, the volume of the pilot chamber 371 does not change, and the pilot chamber 371 cannot absorb an increased amount of introduced oil liquid.

Then, the pressure in the pilot chamber 371 rises to a high pressure, and the pressure in the pilot chamber 371 increases the force of the spool member 285 pushing the main valve 360 in the closing direction. For this reason, the injection-valve opening pressure of the main valve 360 rises, and a damping force increases. Thus, as indicated by a solid line X3 in FIG. 8, a damping force is relatively high, which results in a hard state.

Figure 9:
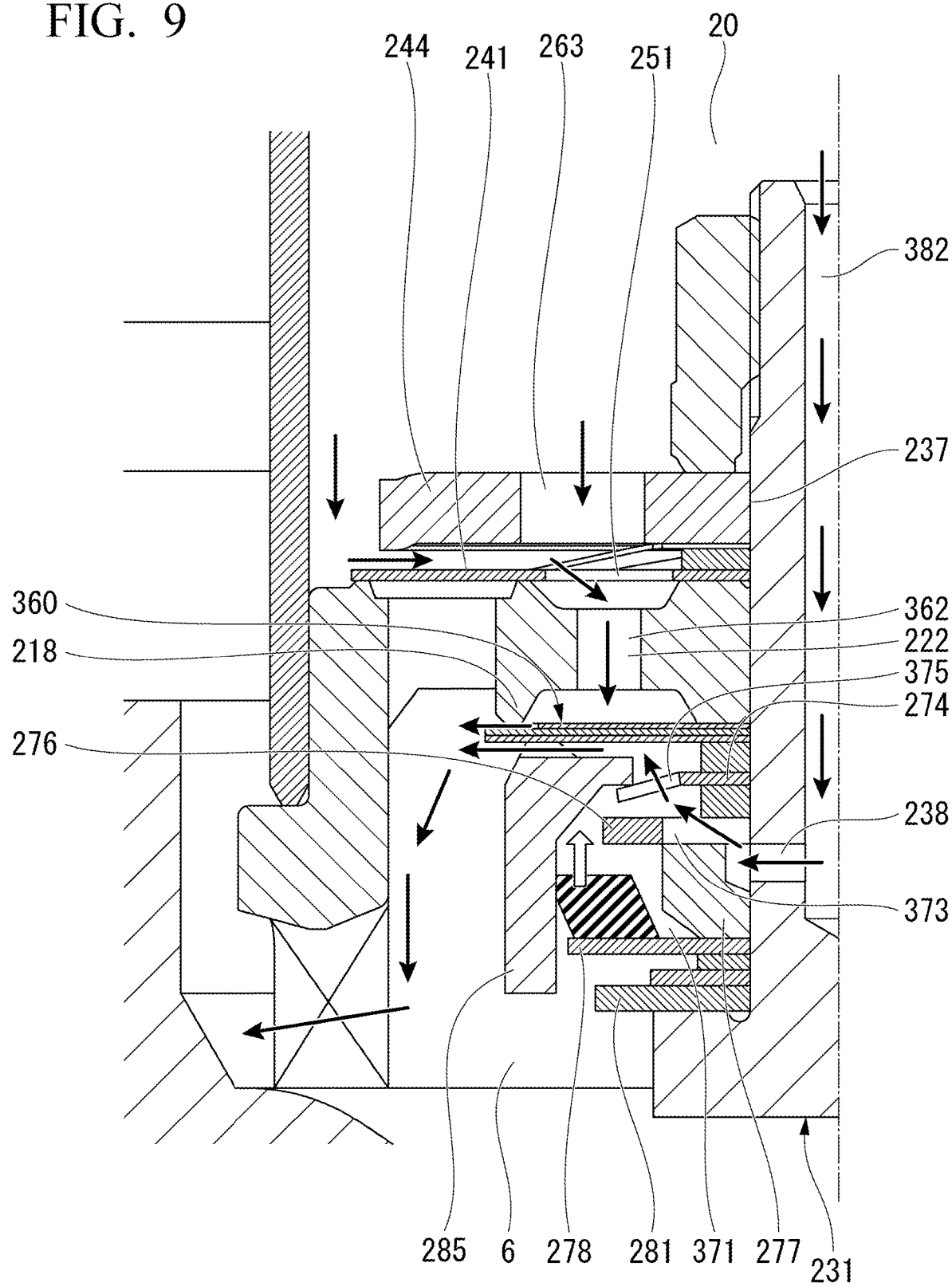
FIG. 9 is a diagram illustrating operations of the vicinity of the base valve illustrating the shock absorber according to the first embodiment of the present invention.

Further, in a contraction stroke when the piston frequency is high, the pressure in the lower chamber 20 rises, and an oil liquid in the lower chamber 20 flows into the reservoir chamber 6 through the passage in the passage hole 251 of the suction valve 241, the passage in the inner passage hole 222, and a gap between the main valve 360 and the lower outer seat portion 218 as indicated by an arrow in FIG. 9. In addition, the oil liquid in the lower chamber 20 is introduced into the second passage 382 and is introduced into the pilot chamber 371 in the middle. That is, an oil liquid is introduced into pilot chamber 371 through the passages in the axial passage hole 237 and the radial passage hole 238 of the pin member 231, the passage in the spacer 277, and the orifice 373 of the disk 276. The oil liquid flows into the reservoir chamber 6 through the orifice 375 from the pilot chamber 371.

At this time, the flow channel cross-sectional area of the orifice 375 is smaller than the flow channel cross-sectional area of the orifice 373, but the volume of the oil liquid stored in the pilot chamber 371 is small. Thus, the partitioning disk 278 has a small bending amount and is easily deformed. For this reason, most of an increased amount of oil liquid introduced into the pilot chamber 371 from the lower chamber 20 is absorbed by the bending of the partitioning disk 278. For this reason, the pressure in the pilot chamber 371 is low, the pressure in the pilot chamber 371 does not increase the force of the spool member 285 pushing the main valve 360 in the closing direction, and the injection-valve opening pressure of the main valve 360 does not increase.

Figure 8:
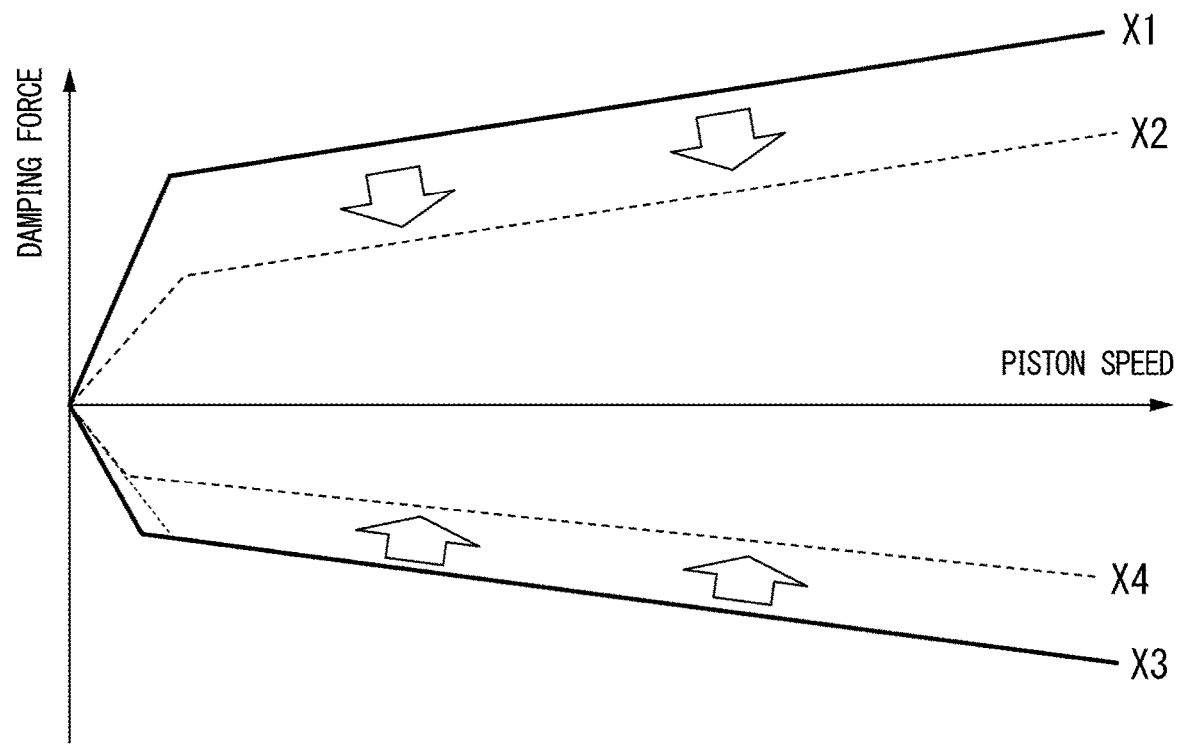
FIG. 8 is a conceptual characteristic line diagram illustrating a damping force characteristic of the base valve of the shock absorber according to the first embodiment of the present invention.

For this reason, when a piston frequency is high, a damping force becomes smaller and softer than when the piston frequency indicated by the solid line X3 in FIG. 8 is low in the entire range of the piston speed from a low speed to a high speed, as indicated by a dashed line X4 in FIG. 8. Thus, in the contraction stroke, damping force characteristics when the piston frequency is high show that a damping force becomes smaller and softer from a low speed range to a high speed range of the piston speed, as compared to the damping force characteristics when the piston frequency is low.

In this manner, when the piston speed is in a wide range from a low speed range to a high speed range in both the extension stroke and the contraction stroke of the base valve 25, the frequency sensitive mechanism 385 makes the damping force softer when the piston frequency is high than when the piston speed is low. Thereby, it is possible to alleviate an impact shock that occurs when the wheels are pushed up from the road surface. Thus, it is possible to improve ride quality.

In addition, the shock absorber 1 has good balance in both the extension stroke and the contraction stroke, and can cut off or suppress vibration when the piston frequency is high, which leads to a further improvement in ride quality.

In addition, the base valve 25 including the frequency sensitive mechanism 385 of the shock absorber 1 has a small axial length sacrifice, can secure a damper stroke, and has an excellent mountability.

The above-mentioned Patent Document 1 discloses a shock absorber having a damping force which is variable in accordance with a piston frequency. There is a demand for miniaturization of such shock absorbers.

The shock absorber 1 of the first embodiment includes the first passage 362 through which an oil liquid flows out from one lower chamber 20 in the cylinder 3 due to the movement of the piston 18, the second passage 382 provided in parallel with the first passage 362, the main valve 360 that is provided in the first passage 362 and generates a damping force, the tubular spool member 285 that can change a biasing force against the main valve 360 by moving in the axial direction, the pilot chamber 371 that is provided in the second passage 382, is located on the inner peripheral side of the spool member 285, and generates a biasing force in the spool member 285 against the main valve 360, and the a partitioning disk 278 that blocks the flow of an oil liquid from the pilot chamber 371 to the reservoir chamber 6 on the other side and is provided to be movable with respect to the spool member 285. Thereby, the shock absorber 1 can be simplified and miniaturized.

Further, the shock absorber 1 of the first embodiment includes the sealing member 312 between the spool member 285 and the partitioning disk 278 that blocks the flow of an oil liquid from the pilot chamber 371 to the reservoir chamber 6 and is provided to be movable with respect to the spool member 285. For this reason, the shock absorber 1 can be further simplified and miniaturized.

Further, in the shock absorber 1 of the first embodiment, the sealing member 312 is provided onto the disk 311 by baking in the partitioning disk 278. Thus, the shock absorber 1 can be further simplified and miniaturized.

Further, in the shock absorber 1 of the first embodiment, the pin member 231 is inserted into the main valve 360, the spool member 285, and the partitioning disk 278, and the second passage 382 is formed in the pin member 231. For this reason, the shock absorber 1 can be further simplified and miniaturized.

In addition, the shock absorber 1 of the first embodiment includes the first passage 362 through which an oil liquid flows out from one lower chamber 20 in the cylinder 3 due to the movement of the piston 18, the main valve 360 that is provided in the first passage 362 and generates a damping force, the bottomed cylindrical outer cylinder 4 that is provided on the outer peripheral side of the cylinder 3, and the base valve 25 that is provided in the bottom portion 192 of the outer cylinder 4 and separates the one lower chamber 20 in the cylinder 3 and the reservoir chamber 6 between the outer cylinder 4 and the cylinder 3. In addition, the base valve 25 is provided with the second passage 382 that is provided in parallel with the first passage 362, and the frequency sensitive mechanism 385 that is provided in the second passage 382 and varies a damping force in accordance with the frequency of the piston 18, and the frequency sensitive mechanism 385 is provided on the bottom portion 192 side of the base valve 25. Thereby, the shock absorber 1 can be miniaturized.

Note that, in the shock absorber 1 of the first embodiment, only the orifice 375 out of the orifices 373 and 375 may be provided.

Second Embodiment

Next, a second embodiment will be described mainly with reference to FIGS. 10 to 12, focusing on differences from the first embodiment. Note that parts in common with the first embodiment are denoted by the same reference numerals and signs.

Figure 10:
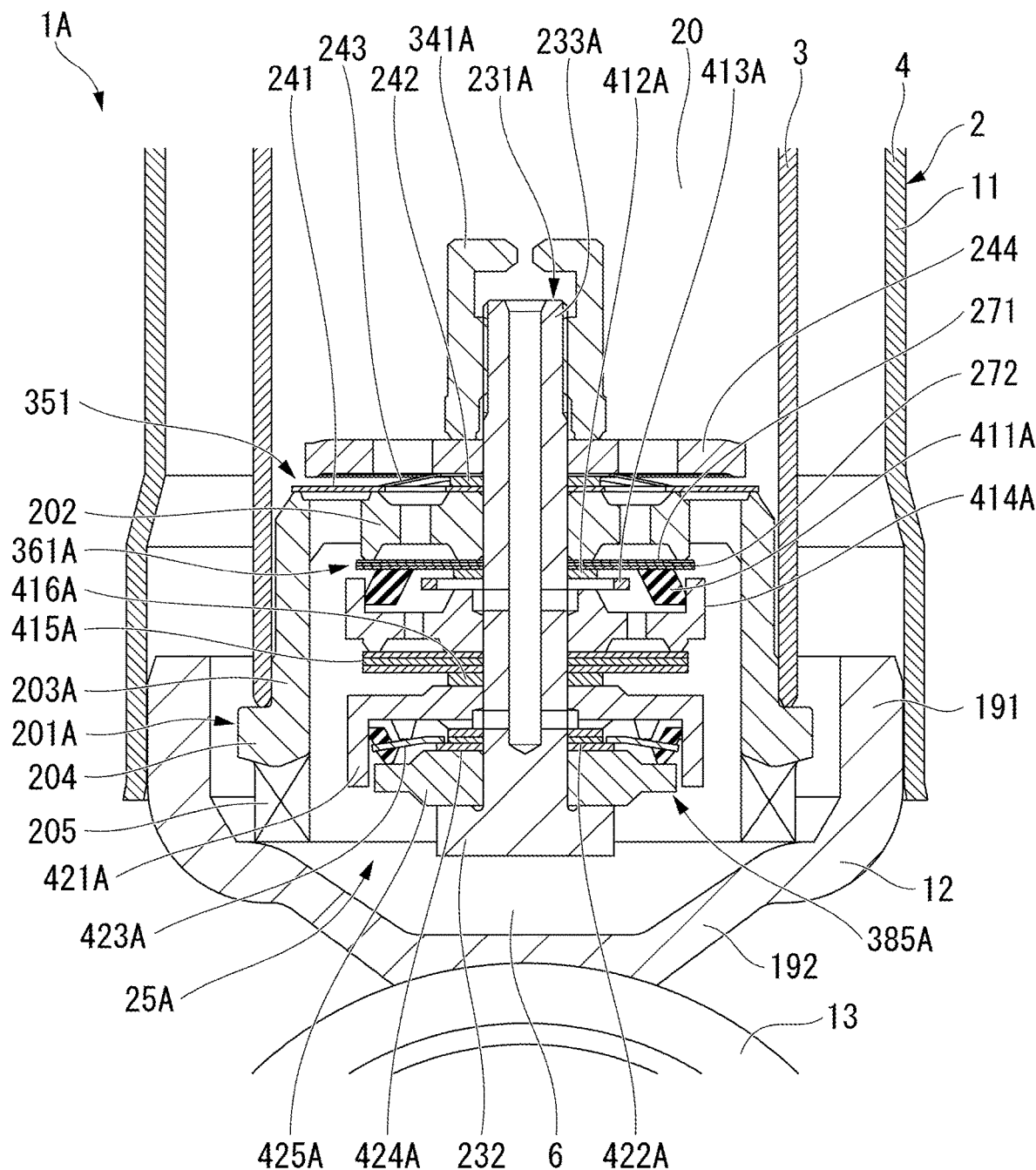
FIG. 10 is a cross-sectional view of the vicinity of a base valve illustrating a shock absorber according to a second embodiment of the present invention.

As illustrated in FIG. 10, in a shock absorber 1A of the second embodiment, a base valve 25A is partially different from the base valve 25 of the first embodiment.

The base valve 25A is also provided on a bottom portion 192 of an outer cylinder 4. The base valve 25A separates one lower chamber 20 in a cylinder 3 and a reservoir chamber 6 between the outer cylinder 4 and the cylinder 3.

The base valve 25A includes a base valve member 201A instead of the base valve member 201. The base valve member 201A differs from the base valve member 201 in that it has a leg portion 203A that is longer than the leg portion 203 in the axial direction.

The base valve 25A includes a pin member 231A (shaft member) instead of the pin member 231. The pin member 231A differs from the pin member 231 in that it has a shaft portion 233A that is longer than the shaft portion 233 in the axial direction.

Figure 11:
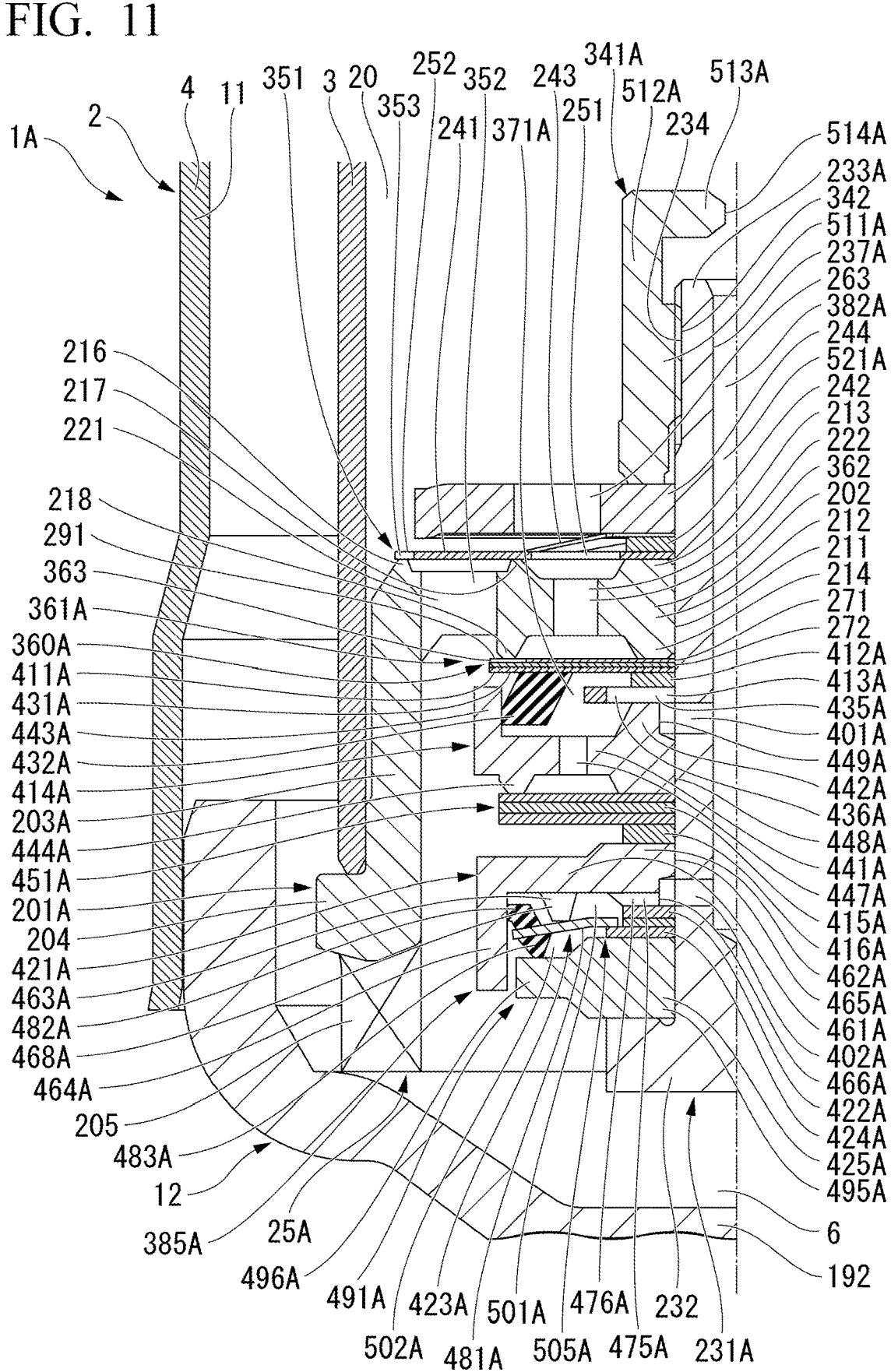
FIG. 11 is a cross-sectional view of one side of the vicinity of the base valve illustrating the shock absorber according to the second embodiment of the present invention.

As illustrated in FIG. 11, the pin member 231A includes an axial passage hole 237A longer than the axial passage hole 237, and a radial passage hole 401A and a radial passage hole 402A both of which penetrate the shaft portion 233A in the radial direction.

In the axial direction of the shaft portion 233A, the radial passage hole 402A is disposed closer to a head 232 than the radial passage hole 401A. The radial passage hole 401A and the radial passage hole 402A are perpendicular to the axial passage hole 237A and communicate with the axial passage hole 237A.

The base valve 25A includes a disk 271 and a disk 272 that are the same as those in the first embodiment on the bottom portion 192 side in the axial direction of the base portion 202 of the base valve member 201A, the disks being disposed in order from the base portion 202 side in the axial direction. The base valve 25A includes one partitioning disk 411A, one disk 412A, one disk 413A, one seat member 414A, and a plurality of, specifically, three disks 415A, and one disk 416A in this order on a side opposite to the disk 271 in the axial direction of the disk 272, instead of the disks 273, 275, 276, 279, and 280, the biasing disk 274, the spacer 277, the partitioning disk 278, and the stopper disk 281, and the spool member 285 of the first embodiment.

In addition, the base valve 25A includes a case member main body 421A, a plurality of disks 422A and partitioning disks 423A, and one disk 424A, and a lid member 425A in order from the disk 416A side in the axial direction on the side of the disk 416A which is opposite to the disk 415A in the axial direction.

The disks 412A, 413A, 415A, 416A, 422A, and 424A, the seat member 414A, the case member main body 421A, and the lid member 425A are all made of a metal.

Each of the disks 412A, 413A, 415A, 416A, 422A, and 424A has a perforated circular flat plate shape, having a fixed thickness, into which the shaft portion 233A of the pin member 231A can be fitted. The partitioning disk 411A, the seat member 414A, the case member main body 421A, and the lid member 425A all have an annular shape into which the shaft portion 233A of the pin member 231A can be fitted. The partitioning disk 423A has an annular shape into which the shaft portion 233A of the pin member 231A can be inserted.

The partitioning disk 411A includes a metal disk 431A and a rubber sealing member 432A fixed to the outer peripheral side of the disk 431A. The partitioning disk 411A is elastically deformable.

The sealing member 432A is integrated with the disk 431A by baking. The disk 431A has a perforated circular flat plate shape, having a fixed thickness, into which the shaft portion 233A of the pin member 231A can be fitted. The disk 431A has an outer diameter equal to the outer diameters of the disks 271 and 272.

The sealing member 432A is fixed to the outer peripheral side of the disk 431A in an annular shape.

The sealing member 432A protrudes from the disk 431A in the axial direction. The sealing member 432A has an outer diameter that increases as the distance from the disk 431A increases in the axial direction, and an inner diameter that increases as the distance from the disk 431A increases in the axial direction. The partitioning disk 411A abuts on the disk 272 on the side of the disk 431A which is opposite to the sealing member 432A. The sealing member 432A extends from the disk 431A to a side opposite to the disk 272. The partitioning disk 411A constitutes a main valve 360A that opens and closes an inner passage hole 222 of the base valve member 201A with the disks 271 and 272.

The disk 412A has an outer diameter smaller than the minimum inner diameter of the sealing member 432A. The disk 412A has a gap in the radial direction between the disk 412A and the sealing member 432A. The disk 413A has an outer diameter larger than the outer diameter of the disk 412A, but has a gap in the radial direction between the disk 413A and the sealing member 432A.

A notch 435A extending outward in the radial direction is formed on the inner peripheral side of the disk 413A. A passage in the notch 435A constitutes an orifice 436A.

The seat member 414A includes a perforated disk-shaped bottom portion 441A extending in a direction perpendicular to the axis, a cylindrical inner cylindrical portion 442A formed on the inner peripheral side of the bottom portion 441A and extending in the axial direction of the bottom portion 441A, a cylindrical outer cylindrical portion 443A formed on the outer peripheral side of the bottom portion 441A and extending in the axial direction of the bottom portion 441A, and an annular valve seat portion 444A protruding in the axial direction of the bottom portion 441A formed on the outer peripheral side of the bottom portion 441A.

The inner cylindrical portion 442A protrudes from the bottom portion 441A to both sides in the axial direction. The outer cylindrical portion 443A protrudes from the outer peripheral end of the bottom portion 441A to one side in the axial direction. The valve seat portion 444A protrudes from the outer peripheral side of the bottom portion 441A to a side opposite to the outer cylindrical portion 443 in the axial direction.

In the bottom portion 441A, a through-hole 447A penetrating the bottom portion 441A in the axial direction is formed between the inner cylindrical portion 442A and the valve seat portion 444A. A small-diameter hole portion 448A into which the shaft portion 233A of the pin member 231A is fitted is formed on the inner side of the inner cylindrical portion 442A in the radial direction and on the valve seat portion 444A side in the axial direction. A large-diameter hole portion 449A having a larger diameter than the small-diameter hole portion 448A is formed on the inner side of the inner cylindrical portion 442A in the radial direction and on the outer cylindrical portion 443 side in the axial direction.

The large-diameter hole portion 449A is aligned with the radial passage hole 401A of the pin member 231A in the axial direction and faces the radial passage hole 401A in the radial direction. Thus, a passage in the large-diameter hole portion 449A communicates with a passage in the radial passage hole 401A at all times.

In the seat member 414A, the outer cylindrical portion 443A protrudes from the bottom portion 441A toward the partitioning disk 411A. The sealing member 432A of the partitioning disk 411A abuts on the inner peripheral surface of the outer cylindrical portion 443A over the entire circumference.

The inner side of the seat member 55 including the through-hole 447A is a pilot chamber 371A that applies pressure to the main valve 360A in the direction of the lower outer seat portion 218. The sealing member 432A of the partitioning disk 411A closes a gap between the sealing member 432A and the outer cylindrical portion 443A over the entire circumference at all times.

Each of the plurality of disks 415A has an outer diameter larger than the outer diameter of the valve seat portion 444A. The plurality of disks 415A constitute a hard valve 451A. The hard valve 451A abuts on the valve seat portion 444A to close the pilot chamber 371A, and is separated from the valve seat portion 444A to open the pilot chamber 371. The disk 416A has an outer diameter smaller than the outer diameter of the hard valve 451A.

The case member main body 421A includes a perforated disk-shaped base portion 461A that expands in a direction perpendicular to the axis, a cylindrical inner cylindrical portion 462A formed on the inner peripheral side of the base portion 461A and extending in the axial direction, a cylindrical seat portion 463A formed closer to the outer peripheral side than the inner cylindrical portion 462A of the base portion 461A and protruding in the axial direction of the base portion 461A, and an outer cylindrical portion 464A, having a cylindrical shape, which is formed at the outer peripheral end of the base portion 461A and extending in the axial direction of the base portion 461A.

The inner cylindrical portion 462A protrudes from the base portion 461A to both sides in the axial direction. The seat portion 463A protrudes from the base portion 461A to only one side in the axial direction. The outer cylindrical portion 464A protrudes from the base portion 461A to the same side as the seat portion 463A in the axial direction. The length of the outer cylindrical portion 464A protruding from the base portion 461A is longer than the length of the seat portion 463A protruding from the base portion 461A. A small-diameter hole portion 465A into which the shaft portion 233A of the pin member 231A is fitted is formed on the inner side of the inner cylindrical portion 462A on a side opposite to the protruding direction of the seat portion 463A in the axial direction. A large-diameter hole portion 466A having a diameter larger than that of the small-diameter hole portion 465A is formed on the inner side of the inner cylindrical portion 462A on the seat portion 463A side in the axial direction.

The case member main body 421A is oriented such that the seat portion 463A and the outer cylindrical portion 464A protrude from the base portion 461A to a side opposite to the hard valve 451A in the axial direction. The seat portion 463A of the case member main body 421A supports the outer peripheral side of the partitioning disk 423A at the end portion on the protrusion tip side.

In addition, a notch 468A is partially formed in the seat portion 463A in the circumferential direction. The notch 468A allows the radially inner side and the radially outer side of the seat portion 463A of the case member main body 421A to communicate with each other at all times.

The large-diameter hole portion 466A on the inner side of the inner cylindrical portion 462A in the radial direction is aligned with the radial passage hole 402A of the pin member 231A in the axial direction. The large-diameter hole portion 466A faces the radial passage hole 402A in the radial direction. Thus, the passage in the large-diameter hole portion 466A communicates with the passage in the radial passage hole 402A at all times.

A radial groove 475A penetrating the inner cylindrical portion 462A in the radial direction is formed in a portion of the inner cylindrical portion 462A which is closer to the outer cylindrical portion 464A in the axial direction than the base portion 461A. The radial groove 475A is aligned with the large-diameter hole portion 466A in the axial direction. Thus, the passage in the radial groove 475A communicates with the passage in the large-diameter hole portion 466A at all times. The passage in the radial groove 475A constitutes an orifice 476A.

The disk 422A has the same diameter as the portion of the inner cylindrical portion 462A that is in contact with the disk 422A and has an outer diameter smaller than the inner diameter of the seat portion 463A. The disk 424A has an outer diameter larger than the outer diameter of the disk 422A.

The partitioning disk 423A includes a metal disk 481A, a rubber sealing member 482A fixed to the outer peripheral side of the disk 481A, and a rubber protruding member 483A fixed to the outer peripheral side of the disk 481A. The partitioning disk 423A is elastically deformable.

The disk 481A has a flat plate shape before assembly. The disk 481A has a perforated circular flat plate shape, having a fixed thickness, in which the disk 422A can be disposed with a gap in the radial direction. The thickness of the disk 481A is smaller than the total thickness of the plurality of disks 422A. The disk 481A has an outer diameter larger than the outer diameter of the seat portion 463A of the case member main body 421A.

The sealing member 482A is fixed in an annular shape to the base portion 461A side in the axial direction on the outer peripheral side of the disk 481A. The sealing member 482A protrudes from the disk 481A toward the base portion 461A in the axial direction. The protruding member 483A is fixed to the outer peripheral side of the disk 481A which is opposite to the base portion 461A in the axial direction. The protruding member 483A protrudes from the disk 481A to the side opposite to the base portion 461A in the axial direction.

In the sealing member 482A, the inner diameter of the end portion on the disk 481A side, that is, the minimum inner diameter, is slightly larger than the outer diameter of the tip portion of the seat portion 463A. Thereby, the disk 481A of the partitioning disk 423A can be seated on the seat portion 463A of the case member main body 421A.

A radial groove, which is not illustrated in the drawing, is formed in the protruding member 483A so as to penetrate the protruding member 483A in the radial direction.

The disk 424A has an outer diameter larger than the inner diameter of the disk 481A of the partitioning disk 423A. Thereby, the inner peripheral side of the partitioning disk 423A is movably supported between the base portion 461A of the case member main body 421A and the disk 424A over the entire thickness range of the plurality of disks 422A.

In addition, an annular sealing member 482A is provided on the outer peripheral side of the partitioning disk 423A, which is the non-supporting side, to seal a gap between the annular sealing member 482A and the outer cylindrical portion 464A of the case member main body 421A. The sealing member 482A contacts the outer cylindrical portion 464A and is centered with respect to the case member main body 421A. In other words, the inner peripheral side of the partitioning disk 423A has a simple support structure in which only one side is supported by the disk 424A without being clamped from both sides.

The lid member 425A is disposed on the radial inner side of the outer cylindrical portion 464A of the case member main body 421A with a gap in the radial direction. The lid member 425A and the case member main body 421A constitute a cylindrical case member 491A.

The lid member 425A includes a tubular portion 495A having a cylindrical shape on the inner peripheral side and a flange portion 496A extending outward in the radial direction from the center of the tubular portion 495A in the axial direction. The protruding member 483A of the partitioning disk 423A abuts on the flange portion 496A of the lid member 425A. In the lid member 425A, a portion of the tubular portion 495A on a side opposite to the case member main body 421A in the axial direction abuts on the head 232 of the pin member 231A.

The sealing member 482A of the partitioning disk 423A is in contact with the inner peripheral surface of the outer cylindrical portion 464A of the case member main body 421A over the entire circumference to seal a gap between the partitioning disk 423A and the outer cylindrical portion 464A. That is, the partitioning disk 423A is a packing valve. The sealing member 482A seals a gap between the partitioning disk 423A and the outer cylindrical portion 464A at all times even when the partitioning disk 423A is deformed in the case member 491A within an allowable range.

The partitioning disk 423A is centered with respect to the case member 491A as described above by the sealing member 482A being in contact with the outer cylindrical portion 464A over the entire circumference. The partitioning disk 423A partitions the inside of the case member 491A into a variable chamber 501A of which the volume is variable on the base portion 461A side of the case member main body 421A and a variable chamber 502A of which the volume is variable on the lid member 425A side. The variable chamber 501A communicates with the passage in the large-diameter hole portion 466A of the case member main body 421A through the passage in the radial groove 475A of the case member main body 421A. The variable chamber 502A communicates with the reservoir chamber 6 through a passage in a gap between the lid member 425A and the outer cylindrical portion 464A.

The inner peripheral side of the partitioning disk 423A is movable between the disk 424A and the base portion 461A of the case member main body 421A. The outer peripheral side of the partitioning disk 423A is movable within a range in which the protruding member 483A is elastically deformed.

Here, a shortest distance in the axial direction between the seat portion 463A and the disk 424A is smaller than the thickness of the disk 481A in the axial direction. Thus, when the variable chamber 501A and the variable chamber 502A have the same pressure, the disk 481A is slightly deformed and pressed against the seat portion 463A and the disk 424A over the entire circumference due to its own elastic force.

The partitioning disk 423A blocks the flow of an oil liquid between the variable chamber 501A and the variable chamber 502A, that is, the reservoir chamber 6, in a state where the inner peripheral side of the partitioning disk 423A is in contact with the disk 424A over the entire inner circumference. In addition, the partitioning disk 423A allows an oil liquid to flow between the variable chamber 502A, that is, the reservoir chamber 6, and the variable chamber 501A in a state where the inner peripheral side of the partitioning disk 423A is separated from the disk 424A.

Thus, the inner peripheral side of the partitioning disk 423A and the disk 424A constitute a check valve 505A that regulates the flow of an oil liquid from the variable chamber 501A to the variable chamber 502A and the reservoir chamber 6, while allowing the flow of an oil liquid from the reservoir chamber 6 and the variable chamber 502A to the variable chamber 501A. The check valve 505A is a free valve in which the entire partitioning disk 423A, which is the valve body thereof, is not clamped in the axial direction.

A nut 341A that is partially different from the nut 341 is provided on the side of the regulation disk 244 which is opposite to the spring disk 243 in the axial direction. The nut 341A includes a nut body portion 511A that is screwed onto a male screw 234 of a pin member 231A and abuts on the regulation disk 244, an annular protruding portion 512A protruding in a direction opposite to the regulation disk 244 from the side of the nut body portion 511A which is opposite to the regulation disk 244 in the axial direction, and an inner flange portion 513A extending inward in the radial direction from the side of the protruding portion 512A which is opposite to the nut body portion 511A in the axial direction.

A passage on the inner side of the inner flange portion 513A in the radial direction is an orifice 514A.

The lower outer seat portion 218 of the base valve member 201A and the main valve 360A, which abuts on the lower outer seat portion 218 and opens and closes the inner passage hole 222 of the base valve member 201A, constitute a damping force generation mechanism 361A on a contraction side. The inner passage hole 222 of the base valve member 201A and a passage between the main valve 360A and the lower outer seat portion 218, which is generated when the valve is opened, constitute a first passage 362 on the contraction side which can allow the lower chamber 20 and the reservoir chamber 6 to communicate with each other, similar to the first embodiment.

An oil liquid flows out from one of the lower chambers 20 in the cylinder 3 toward the reservoir chamber 6 through the first passage 362 due to the movement of the piston 18. A passage in a notch 291 provided in the disk 271 constitutes a fixed orifice 363. The main valve 360A of the damping force generation mechanism 361A is provided in the first passage 362 and generates a damping force. The first passage 362 is provided in the base valve 25A.

A space between the inner flange portion 513A in the nut 341A and the pin member 231A, spaces in the axial passage hole 237A of the pin member 231A and the radial passage holes 401A and 402A, a space in the large-diameter hole portion 449A of the seat member 414A, and a space in the large-diameter hole portion 466A of the case member main body 421A constitute an intermediate chamber 521A.

The orifice 514A in the inner flange portion 513A of the nut 341A, the intermediate chamber 521A, the orifice 436A in the notch 435A of the disk 413A that branches off from the intermediate chamber 521A to one side, the pilot chamber 371A, and a gap between the hard valve 451A and the valve seat portion 444A, which is generated when the valve is opened, constitutes a second passage 382A provided in parallel with the first passage 362.

The second passage 382A includes the orifice 476A in the radial groove 475A of the case member main body 421A branching off from the intermediate chamber 521A to the other side, and the variable chambers 501A and 502A. The second passage 382A is provided in parallel with the first passage 362 in the base valve 25A.

The case member 491A, the disks 422A and 424A, and the partitioning disk 423A constitute a frequency sensitive mechanism 385A that varies a damping force in accordance with the frequency of the piston 18. The frequency sensitive mechanism 385A is provided in the second passage 382A. The frequency sensitive mechanism 385A is provided on the bottom portion 192 side of the base valve 25A.

Figure 12:
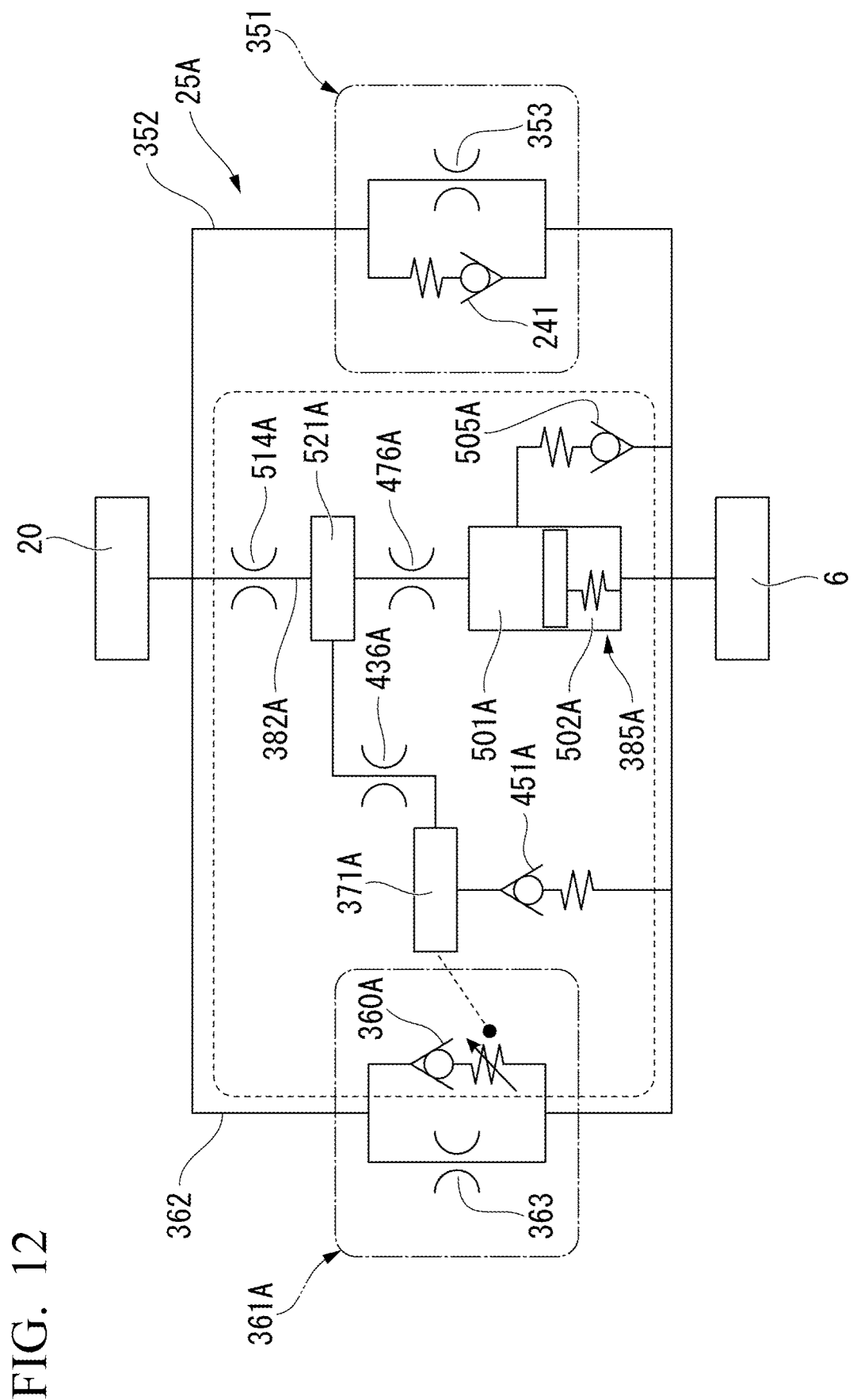
FIG. 12 is a hydraulic circuit diagram of the base valve illustrating the shock absorber according to the second embodiment of the present invention.

A hydraulic circuit diagram of the base valve 25A is illustrated in FIG. 12.

The contraction-side first passage 362 that allows the lower chamber 20 and the reservoir chamber 6 to communicate with each other is provided with the damping force generation mechanism 361A including the main valve 360 and the fixed orifice 363. The second passage 382A provided in parallel with the first passage 362 is provided with the orifice 514A and the intermediate chamber 521A.

The second passage 382A branches off from the intermediate chamber 521A to one side. The second passage 382A is provided with the orifice 436A, the pilot chamber 371A, and the hard valve 451A. The second passage 382A branches off from the intermediate chamber 521A to the other side. The second passage 382A is provided with the orifice 476A, the frequency sensitive mechanism 385A including the variable chambers 501A and 502A, and the check valve 505A.

The pilot chamber 371A applies its pressure to the main valve 360A of the damping force generation mechanism 361A in the closing direction. The main valve 360A forms the pilot chamber 371A. Thus, the main valve 360A directly receives the pilot pressure to control the injection-valve opening pressure.

Next, operations of the base valve 25A will be described.

Assuming that there is no frequency sensitive mechanism 385A during a contraction stroke in which the piston rod 21 moves to the contraction side, an oil liquid from the lower chamber 20 flows into the first passage 362 and the second passage 382A when the piston speed is slow. At this time, regarding a force (hydraulic pressure) acting on the main valve 360A, a force in the opening direction which is applied from the first passage 362 is smaller than a force in the closing direction which is applied from the pilot chamber 371A, and thus an oil liquid mainly flows into the reservoir chamber 6 through the orifice 363 of the first passage 362. That is, the oil liquid from the lower chamber 20 flows into the reservoir chamber 6 through a passage in the passage hole 251 of the suction valve 241, a passage in the inner passage hole 222 of the base valve member 201A, and the fixed orifice 363 of the main valve 360A.

For this reason, a damping force is generated based on the orifice characteristics (the damping force is substantially proportional to the square of the piston speed). Thus, the characteristics of the damping force with respect to the piston speed when the piston speed is in a low speed range show that the rate of increase in the damping force is relatively high with respect to an increase in the piston speed.

In addition, when the piston speed increases, the oil liquid from the lower chamber 20 flows into the lower chamber 20 through a space between the hard valve 451A and the valve seat portion 444A from the orifice 514A, the intermediate chamber 521A, the orifice 436A, and the pilot chamber 371A of the second passage 382A while opening the hard valve 451A. At this time, a damping force is generated based on the valve characteristics (the damping force is substantially proportional to the piston speed). For this reason, the characteristics of the damping force with respect to the piston speed when the piston speed is in a medium speed range show that the rate of increase in the damping force with respect to an increase in the piston speed has become slightly lower than that in the low speed range described above.

Regarding a force (hydraulic pressure) acting on the main valve 360A, when the piston speed further increases, a force in the opening direction which is applied from the first passage 362 becomes larger than a force in the closing direction which is applied from the pilot chamber 371A. Thus, the oil liquid from the lower chamber 20 opens the main valve 360A of the first passage 362 and flows into the reservoir chamber 6 in addition to the flow described above. That is, the oil liquid from the lower chamber 20 flows into the reservoir chamber 6 through a passage in the passage hole 251 of the suction valve 241, a passage in the inner passage hole 222 of the base valve member 201A, and a gap between the deformed main valve 360A and the lower outer seat portion 218 of the base valve member 201A.

For this reason, a damping force is generated based on the valve characteristics (the damping force is substantially proportional to the piston speed). Thus, the characteristics of the damping force with respect to the piston speed when the piston speed is in a high speed range show that the rate of increase in the damping force with respect to an increase in the piston speed is maintained in a state of being lower than that in the low speed range.

In the above, it is assumed that there is no frequency sensitive mechanism 385A in the contraction stroke. In the second embodiment, the frequency sensitive mechanism 385A varies a damping force in accordance with a piston frequency even when the piston speed is the same.

That is, in a contraction stroke when the piston frequency is low, a large portion of an oil liquid flowing into the second passage 382A from the lower chamber 20 is introduced into the variable chamber 501A through the orifice 476A from the intermediate chamber 521A. For this reason, the partitioning disk 423A is greatly bent at the initial stage when an oil liquid is introduced into the variable chamber 501A from the lower chamber 20, but further deformation is regulated by the lid member 425A. Thereby, the volume of the variable chamber 501A does not change, and an oil liquid is no longer introduced into the variable chamber 501A.

Then, since the amount of oil liquid flowing into the reservoir chamber 6 from the lower chamber 20 through the damping force generation mechanism 361A and the hard valve 451A does not decrease as described above, a high damping force is generated in the same manner as when the frequency sensitive mechanism 385A is not provided.

Further, in a contraction stroke when the piston frequency is high, a portion of an oil liquid flowing into the second passage 382A from the lower chamber 20 is introduced into the variable chamber 501A through the orifice 476A from the intermediate chamber 521A. However, since the amount of oil liquid is small, the partitioning disk 423A bends and absorbs it.

Thus, since the amount of oil liquid flowing into the reservoir chamber 6 through the damping force generation mechanism 361A and the hard valve 451A from the lower chamber 20 decreases as described above, a damping force decreases as compared to when the piston frequency is low.

Since the orifice 514A is provided at an end portion of the second passage 382A on the lower chamber 20 side, a cutoff frequency of a damping force can be adjusted with the area of the orifice 514A. When the area of the orifice 514A is small, the volume of an oil liquid flowing into the variable chamber 501A through the pin member 231A is small, and the stroke of the partitioning disk 423A is small. The frequency sensitive mechanism 385A becomes a low spring when the stroke of the partitioning disk 423A is small, and becomes a high spring when the stroke of the partitioning disk 423A is large.

For this reason, when the stroke is small, the frequency sensitive mechanism 385A easily moves, the volume of an oil liquid flowing into the variable chamber 501A is compensated for, and a rise in the pilot pressure pushing the partitioning disk 411A is suppressed. A cutoff frequency decreases because a higher amplitude (lower frequency) is required to achieve a hard state. On the other hand, when the area of the orifice 514A is large, an opposite result is obtained, and a cutoff frequency increases.

The shock absorber 1A of the second embodiment described above includes the first passage 362 through which an oil liquid flows out from one chamber 20 in the cylinder 3 due to the movement of the piston 18, the main valve 360A that is provided in the first passage 362 and generates a damping force, the bottomed cylindrical outer cylinder 4 that is provided on the outer peripheral side of the cylinder 3, and the base valve 25A that is provided on the bottom portion 192 of the outer cylinder 4 and separates the reservoir chamber 6 between the outer cylinder 4 and the cylinder 3, and one chamber 20 in the cylinder 3. In addition, the base valve 25A is provided with the second passage 382A that is provided in parallel with the first passage 362 and the frequency sensitive mechanism 385A that is provided in the second passage 382A and varies a damping force in accordance with the frequency of the piston 18, and the frequency sensitive mechanism 385A is provided on the bottom portion 192 side of the base valve 25A.

Thereby, the shock absorber 1A can be miniaturized.

The shock absorber 1A of the second embodiment can vary a damping force with respect to a piston frequency in both an extension stroke and a contraction stroke in a wide speed range of piston speeds from a low speed range to a high speed range (decreases a damping force at a high frequency).

Third Embodiment

Next, a third embodiment will be described mainly with reference to FIGS. 13 to 15, focusing on differences from the second embodiment. Note that parts in common with the second embodiment are denoted by the same reference numerals and signs.

Figure 13:
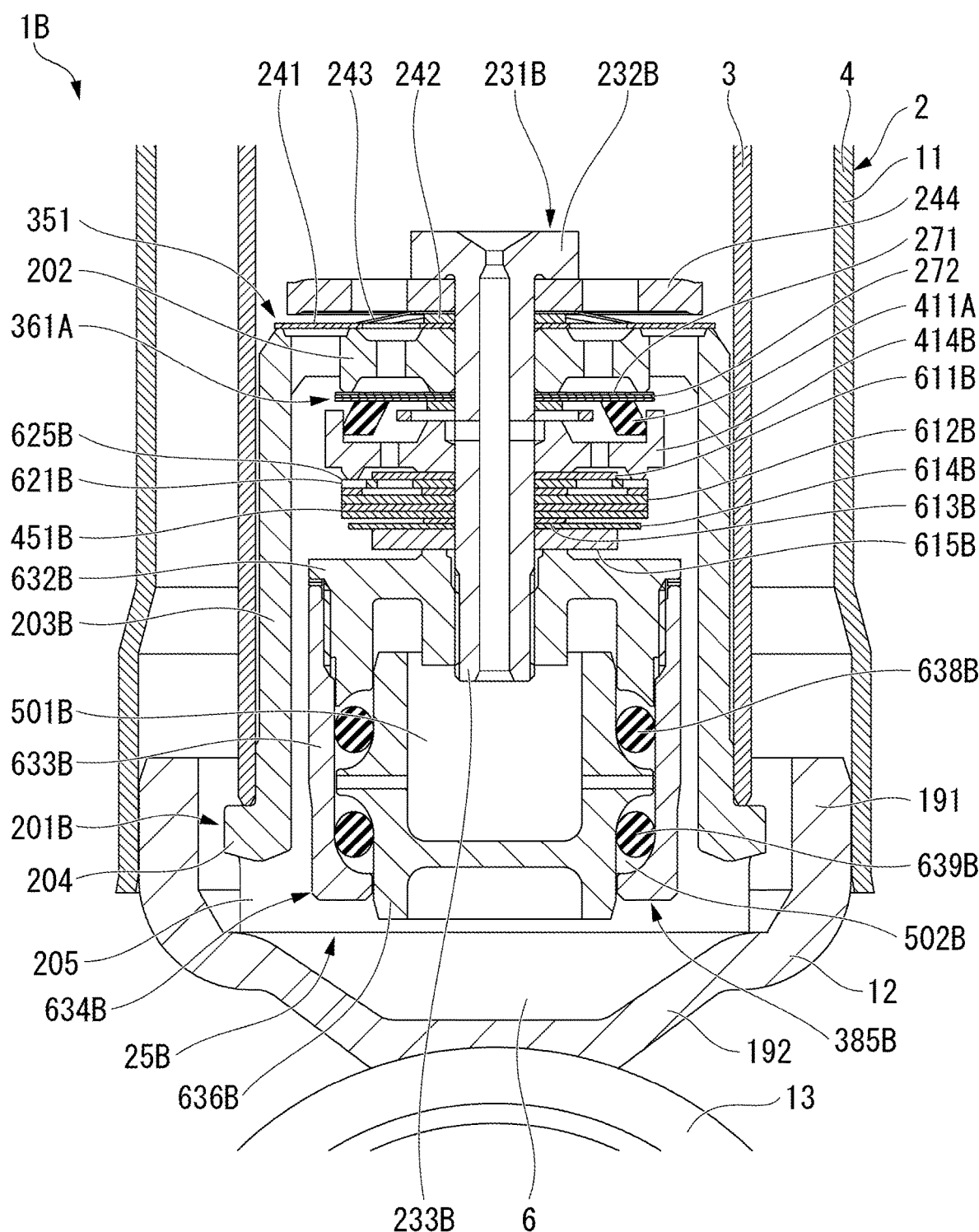
FIG. 13 is a cross-sectional view of the vicinity of a base valve illustrating the shock absorber according to a third embodiment of the present invention.

As illustrated in FIG. 13, in a shock absorber 1B of the third embodiment, a base valve 25B is partially different from the base valve 25A of the second embodiment. The base valve 25B is also provided on a bottom portion 192 of an outer cylinder 4. The base valve 25B separates one lower chamber 20 within a cylinder 3 and a reservoir chamber 6 between the outer cylinder 4 and the cylinder 3.

The base valve 25B includes a base valve member 201B instead of the base valve member 201A. The base valve member 201B differs from the base valve member 201A in that it has a leg portion 203B that is longer than the leg portion 203A in the axial direction.

Figure 14:
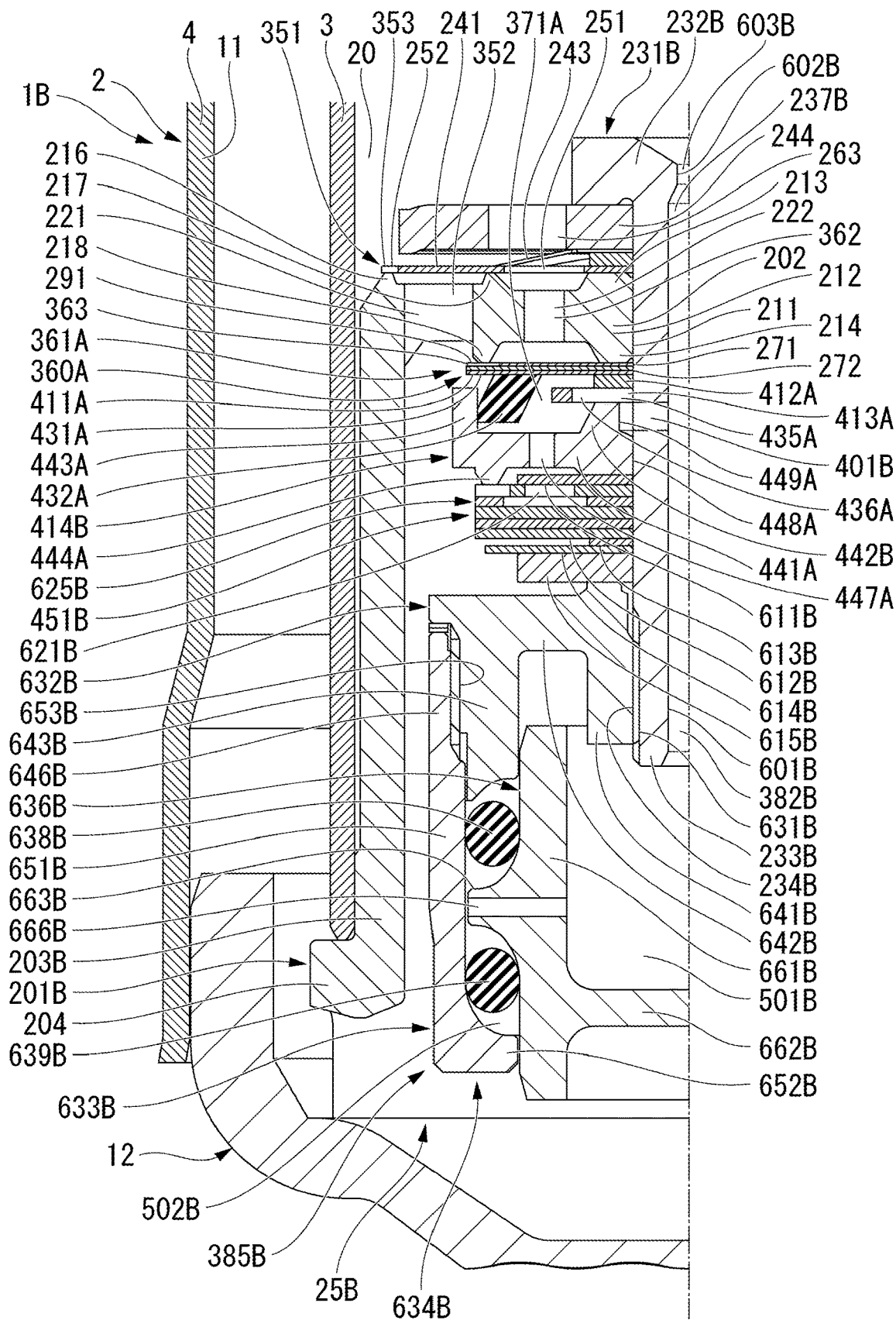
FIG. 14 is a cross-sectional view of one side of the vicinity of the base valve illustrating the shock absorber according to the third embodiment of the present invention.
Figure 15:
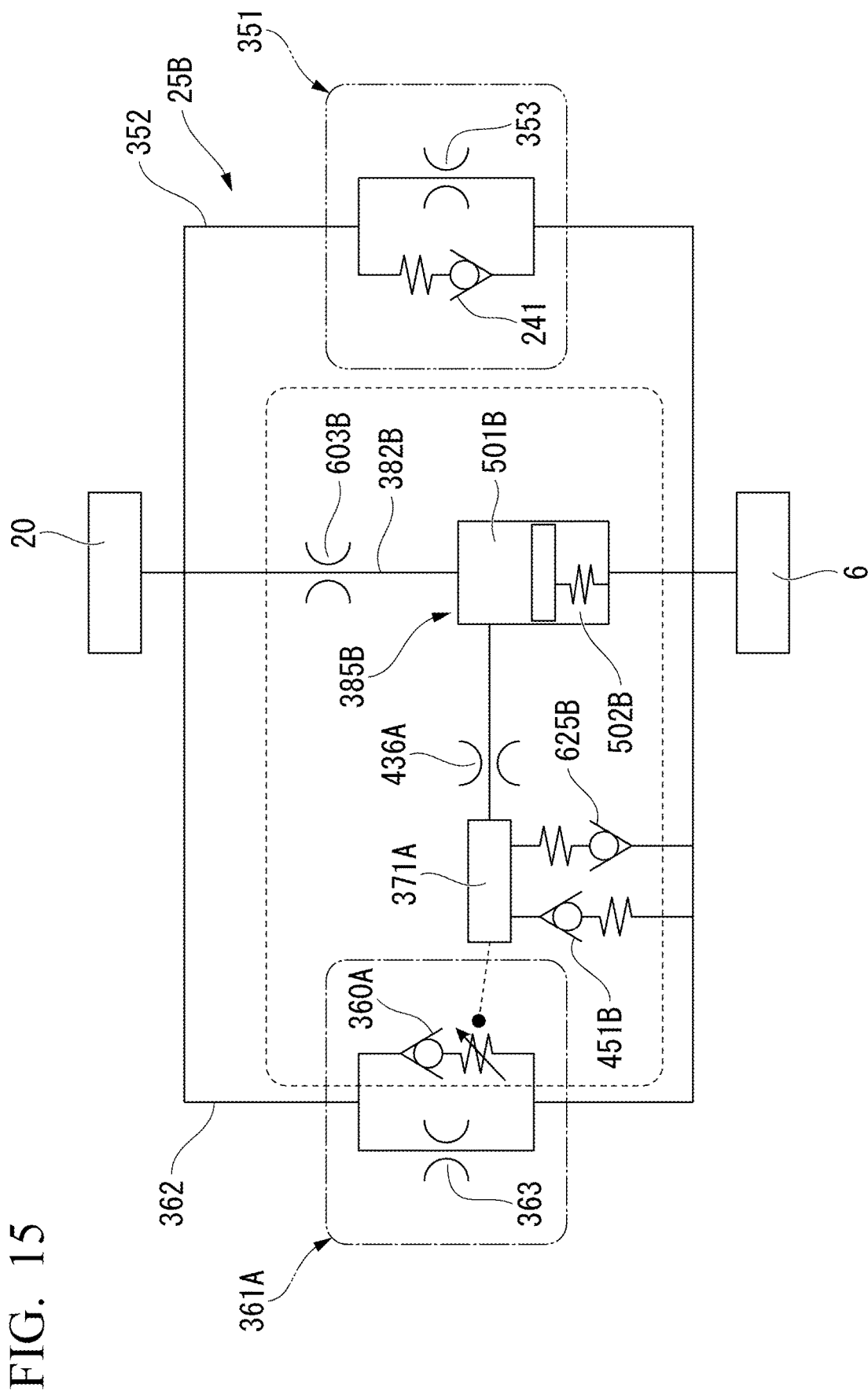
FIG. 15 is a hydraulic circuit diagram of the base valve illustrating the shock absorber according to the third embodiment of the present invention.

As illustrated in FIG. 14, the base valve 25B includes a pin member 231B (shaft member) different from the pin member 231A, instead of the pin member 231A. The pin member 231B is a hollow bolt. The pin member 231B includes a head 232B that can engage with a fastening tool, and a columnar shaft portion 233B that extends from the center of the head 232B and has a diameter smaller than the minimum outer diameter of the head 232B. A male screw 234B is formed on the outer peripheral portion of the shaft portion 233B on a side opposite to the head 232B in the axial direction.

An axial passage hole 237B penetrating the pin member 231B in the axial direction is formed in the center of the pin member 231B in the radial direction. A radial passage hole 401B that penetrates the shaft portion 233B in the radial direction is formed at a predetermined intermediate position of the shaft portion 233B in the axial direction. The radial passage hole 401B is perpendicular to the axial passage hole 237B and communicates with the axial passage hole 237B.

The axial passage hole 237B includes a large-diameter hole portion 601B extending from the end face of the shaft portion 233B in the axial direction on a side opposite to the head 232B to the head 232B side through the radial passage hole 401B, and a small-diameter hole portion 602B which is provided in the head 232B and has a diameter smaller than that of the large-diameter hole portion 601B.

A passage in the small-diameter hole portion 602B is an orifice 603B. The head 232B of the pin member 231B abuts on a regulation disk 244. In the pin member 231B, the axial passage hole 237B communicates with the lower chamber 20.

The base valve 25B includes a seat member 414B that is partially different from the seat member 414A. The seat member 414B includes an inner cylindrical portion 442B that is partially different from the inner cylindrical portion 442A.

In the inner cylindrical portion 442B, the amount of protrusion from the bottom portion 441A to the same side as the valve seat portion 444A in the axial direction is smaller than that of the inner cylindrical portion 442A. In the pin member 231B, the radial passage hole 401B communicates with a pilot chamber 371A through a passage in the large-diameter hole portion 449A of the seat member 414A.

The base valve 25B includes one disk 611B, a plurality of disks 612B, one disk 613B, one disk 614B, and one regulation disk 615B on the side of the seat member 414A which is opposite to the disk 413A in the axial direction, instead of the disks 415A and 416A.

The disks 611B to 614B and the regulation disk 615B are all made of a metal.

Each of the disks 611B to 614B and the regulation disk 615B have a perforated circular flat plate shape, having a fixed thickness, into which the shaft portion 233B of the pin member 231B can be fitted.

The disk 611B has an outer diameter smaller than the minimum inner diameter of the valve seat portion 444A of the seat member 414B. A notch passage 621B is formed in the plurality of disks 612B. The disk 613B has an outer diameter smaller than the outer diameter of the disk 611B.

The disk 614B has an outer diameter larger than the outer diameter of the disk 613B and smaller than the outer diameter of the disk 612B. The regulation disk 615B has an outer diameter smaller than the outer diameter of the disk 614B. The regulation disk 615B has a thickness and rigidity larger than those of the disks 611B to 614B.

The plurality of disks 612B constitute a hard valve 451B that closes the pilot chamber 371A by abutting on the valve seat portion 444A and opens the pilot chamber 371 by separating from the valve seat portion 444A.

The regulation disk 615B suppresses deformation of the hard valve 451B together with the disk 614B by a predetermined amount or more when the hard valve 451B is opened. The disk 611B and the plurality of disks 612B constitute a check valve 625B that allows an oil liquid to flow from the lower chamber 20 to the pilot chamber 371A through the notch passage 621B.

The base valve 25B includes a frequency sensitive mechanism 385B instead of the frequency sensitive mechanism 385A on the side of the regulation disk 615B which is opposite to the disk 614B in the axial direction. The frequency sensitive mechanism 385B is screwed onto the male screw 234B of the pin member 231B.

The frequency sensitive mechanism 385B includes a housing 634B, which is constituted by a lid member 632B in which a female screw 631B screwed onto the male screw 234B of the pin member 231B is formed and a substantially cylindrical housing main body 633B attached to the lid member 632B so that an opening side at one end thereof is closed, a free piston 636B slidably inserted into the housing 634B, and O-rings 638B and 639B which are elastic bodies, both of which are interposed between the housing 634B and the free piston 636B.

The lid member 632B is made of a metal and is formed mainly by cutting. The lid member 632B includes a substantially cylindrical lid inner cylinder portion 641B, a disk-shaped lid substrate portion 642B extending outward in the radial direction from an end portion of the lid inner cylinder portion 641B in the axial direction, and a lid outer tubular portion 643B extending from the outer peripheral side of the lid substrate portion 642B to the same side as the lid inner cylinder portion 641B in the axial direction.

The above-mentioned female screw 631B is formed in the inner peripheral portion of the lid inner cylinder portion 641B. A male screw 616B is formed on the outer peripheral surface of the lid outer tubular portion 643B.

The housing main body 633B is made of a metal mainly by cutting. The housing main body 633B includes a cylindrical main body 651B and an inner annular protrusion 652B protruding inward in the radial direction from one end of the main body 651B in the axial direction.

A female screw 653B is formed on the inner peripheral surface of the main body 651B on a side opposite to the inner annular protrusion 652B in the axial direction. The male screw 646B of the lid member 632B is screwed into the female screw 653B of the housing main body 633B, and these are integrated into a housing 634B.

The free piston 636B is made of a metal mainly by cutting. The free piston 636B includes a substantially cylindrical piston cylinder portion 661B, a piston closing plate portion 662B that closes one side of the piston cylinder portion 661B in the axial direction, and an outer annular protrusion 663B, having an annular shape, which protrudes outward in the radial direction from the center of the piston cylinder portion 661B in the axial direction.

Passage holes 666B penetrating the piston cylinder portion 661B and the outer annular protrusion 663B in the radial direction are formed at a plurality of locations at intervals in the circumferential direction of the free piston 636B at the center position of the outer annular protrusion 663B in the axial direction. The free piston 636B is inserted into the housing 634B so as to be slidable in the axial direction.

In addition, an O-ring 638B is provided between the outer annular protrusion 663B of the free piston 636B and the lid outer tubular portion 643B of the lid member 632B. An O-ring 639B is provided between the outer annular protrusion 663B of the free piston 636B and the inner annular protrusion 652B of the housing main body 633B.

When the free piston 636B moves toward the lid member 632B in the axial direction with respect to the housing 634B, the outer annular protrusion 663B and the lid outer tubular portion 643B of the lid member 632B sandwich and elastically deform the O-ring 638B. Further, when the free piston 636B moves to a side opposite to the lid member 632B in the axial direction with respect to the housing 634B, the outer annular protrusion 663B and the inner annular protrusion 652B of the housing main body 633B sandwich and elastically deform the O-ring 639B.

In the frequency sensitive mechanism 385B, a space between the lid member 632B and the lid member 632B side of the free piston 636B is a variable chamber 501B that communicates with the lower chamber 20 through the axial passage hole 237B of the pin member 231B. The variable chamber 501B includes a passage in the passage hole 666B of free piston 636B and a space between the O-rings 638B and 639B.

In the frequency sensitive mechanism 385B, a space between the O-ring 639B and the inner annular protrusion 652B of the housing main body 633B is a variable chamber 502B that communicates with the reservoir chamber 6.

Communication between the variable chamber 501B and the variable chamber 502B is blocked by the O-ring 639B.

The lower outer seat portion 218 of the base valve member 201B and the main valve 360A, which abuts on the lower outer seat portion 218 and opens and closes the inner passage hole 222 of the base valve member 201B, constitute a damping force generation mechanism 361A on a contraction side similar to that of the second embodiment. The inner passage hole 222 of the base valve member 201B and a passage between the main valve 360A and the lower outer seat portion 218, which is generated when the valve is opened, constitute a first passage 362 on the contraction side which can allow the lower chamber 20 and the reservoir chamber 6 to communicate with each other, similar to the first and second embodiments.

In the first passage 362, an oil liquid flows out from one lower chamber 20 in the cylinder 3 toward the reservoir chamber 6 due to the movement of the piston 18. A passage in a notch 291 provided in the disk 271 constitutes a fixed orifice 363. The main valve 360A of the damping force generation mechanism 361A is provided in the first passage 362 and generates a damping force. The first passage 362 is provided in the base valve 25B.

The variable chamber 501B is also formed on the side of the axial passage hole 237B of the pin member 231B which is opposite to the lower chamber 20 with respect to the orifice 603B, in the radial passage hole 401B, and in the large-diameter hole portion 449A of the seat member 414A. The orifice 603B, the variable chamber 501B, the orifice 436A in the disk 413A, the pilot chamber 371A, and a gap between the hard valve 451B and the valve seat portion 444A, which is generated when the valve is opened, constitute a second passage 382B provided in parallel with the first passage 362.

The second passage 382B also includes the variable chamber 502B. The second passage 382B is provided in parallel with the first passage 362 in the base valve 25B. The frequency sensitive mechanism 385B is provided in the second passage 382B. The frequency sensitive mechanism 385B is provided on the bottom portion 192 side of the base valve 25B.

A hydraulic circuit diagram of the base valve 25B described above is as illustrated in FIG. 15.

That is, the damping force generation mechanism 361A including the main valve 360A and the fixed orifice 363 is provided in the first passage 362 on the contraction side which allows the lower chamber 20 and the reservoir chamber 6 to communicate with each other. In addition, the second passage 382B provided in parallel with the first passage 362 communicates with the lower chamber 20 through the orifice 603B. The variable chamber 501B of the frequency sensitive mechanism 385B is provided on the side of the orifice 603B which is opposite to the lower chamber 20 in the second passage 382B. Further, the second passage 382B is provided with the orifice 436A extending from the variable chamber 501B. The pilot chamber 371A is provided through the orifice 436A.

In addition, a hard valve 451B and a check valve 625B are provided between the pilot chamber 371A and the reservoir chamber 6 in the second passage 382B. Further, the second passage 382A communicates with the reservoir chamber 6 through the variable chamber 502B of the frequency sensitive mechanism 385B. The pilot chamber 371A applies its pressure to the main valve 360A of the damping force generation mechanism 361A in the closing direction.

Next, operations of the base valve 25B will be described.

Assuming that there is no frequency sensitive mechanism 385B during a contraction stroke in which the piston rod 21 moves to the contraction side, an oil liquid from the lower chamber 20 flows into the first passage 362 and the second passage 382B when the piston speed is slow. Regarding a force (hydraulic pressure) acting on the main valve 360A, a force in the opening direction which is applied from the first passage 362 is smaller than a force in the closing direction which is applied from the pilot chamber 371A, and thus an oil liquid mainly flows into the reservoir chamber 6 through the orifice 363 of the first passage 362.

That is, the oil liquid from the lower chamber 20 flows into the reservoir chamber 6 through a passage in the passage hole 251 of the suction valve 241, a passage in the inner passage hole 222 of the base valve member 201B, and the fixed orifice 363 of the main valve 360A. For this reason, a damping force is generated based on the orifice characteristics (the damping force is substantially proportional to the square of the piston speed). Thus, the characteristics of the damping force with respect to the piston speed when the piston speed is in a low speed range show that the rate of increase in the damping force is relatively high with respect to an increase in the piston speed.

In addition, when the piston speed increases, the oil liquid from the lower chamber 20 flows into the lower chamber 20 through a space between the hard valve 451B and the valve seat portion 444A from the orifice 603B, the orifice 436A, and the pilot chamber 371A of the second passage 382B while opening the hard valve 451B. A damping force is generated based on the valve characteristics (the damping force is substantially proportional to the piston speed).

For this reason, the characteristics of the damping force with respect to the piston speed when the piston speed is in a medium speed range show that the rate of increase in the damping force with respect to an increase in the piston speed has become slightly lower than that in the low speed range described above.

Regarding a force (hydraulic pressure) acting on the main valve 360A, when the piston speed further increases, a force in the opening direction which is applied from the first passage 362 becomes larger than a force in the closing direction which is applied from the pilot chamber 371A. Thus, the oil liquid from the lower chamber 20 opens the main valve 360A of the first passage 362 and flows into the reservoir chamber 6 in addition to the flow described above. That is, the oil liquid from the lower chamber 20 flows into the reservoir chamber 6 through a passage in the passage hole 251 of the suction valve 241, a passage in the inner passage hole 222 of the base valve member 201B, and a gap between the deformed main valve 360A and the lower outer seat portion 218 of the base valve member 201B.

For this reason, a damping force is generated based on the valve characteristics (the damping force is substantially proportional to the piston speed). Thus, the characteristics of the damping force with respect to the piston speed when the piston speed is in a high speed range show that the rate of increase in the damping force with respect to an increase in the piston speed is maintained in a state of being lower than that in the low speed range.

In the above, it is assumed that there is no frequency sensitive mechanism 385B in the contraction stroke. In the third embodiment, the frequency sensitive mechanism 385B varies a damping force in accordance with a piston frequency even when the piston speed is the same.

That is, in a contraction stroke when the piston frequency is low, a large portion of an oil liquid flowing into the second passage 382B from the lower chamber 20 is introduced into the variable chamber 501B. For this reason, at the initial stage when an oil liquid is introduced into the variable chamber 501B from the lower chamber 20, the free piston 636B greatly moves in a direction in which the variable chamber 501B expands. However, the free piston 636B crushes the O-ring 639B. For this reason, further movement of the free piston 636B is regulated by the O-ring 639B and the inner annular protrusion 652B.

Thereby, the volume of the variable chamber 501B does not change, and an oil liquid is no longer introduced into the variable chamber 501B. For this reason, the amount of oil liquid flowing into the reservoir chamber 6 from the lower chamber 20 through the damping force generation mechanism 361A and the hard valve 451B does not decrease as described above. A high damping force is generated in the same manner as when the frequency sensitive mechanism 385B is not provided.

Further, in a contraction stroke when the piston frequency is high, a portion of an oil liquid flowing into the second passage 382B from the lower chamber 20 is introduced into the variable chamber 501B. However, since the amount of oil liquid is small, the free piston 636B moves in a direction in which the variable chamber 501B expands, and absorbs it. Thus, as compared to when the piston frequency is low, the amount of oil liquid flowing into the reservoir chamber 6 from the lower chamber 20 through the damping force generation mechanism 361A and the hard valve 451B is reduced as described above, and the damping force decreases.

Further, in the third embodiment, there is no check valve in the free piston portion. Since the check valve 625B for the pilot chamber 371A is installed on a reverse stroke (extension stroke) side of the hard valve 451B, an oil liquid directly flows into the pilot chamber 371A from the reservoir chamber 6 and is compensated for. For this reason, it is possible to prevent a delay in closing the main valve 360A.

Fourth Embodiment

Next, a fourth embodiment will be described mainly with reference to FIGS. 16 to 18, focusing on differences from the first and third embodiments. Note that parts in common with the first and third embodiments are denoted by the same reference numerals and signs.

Figure 16:
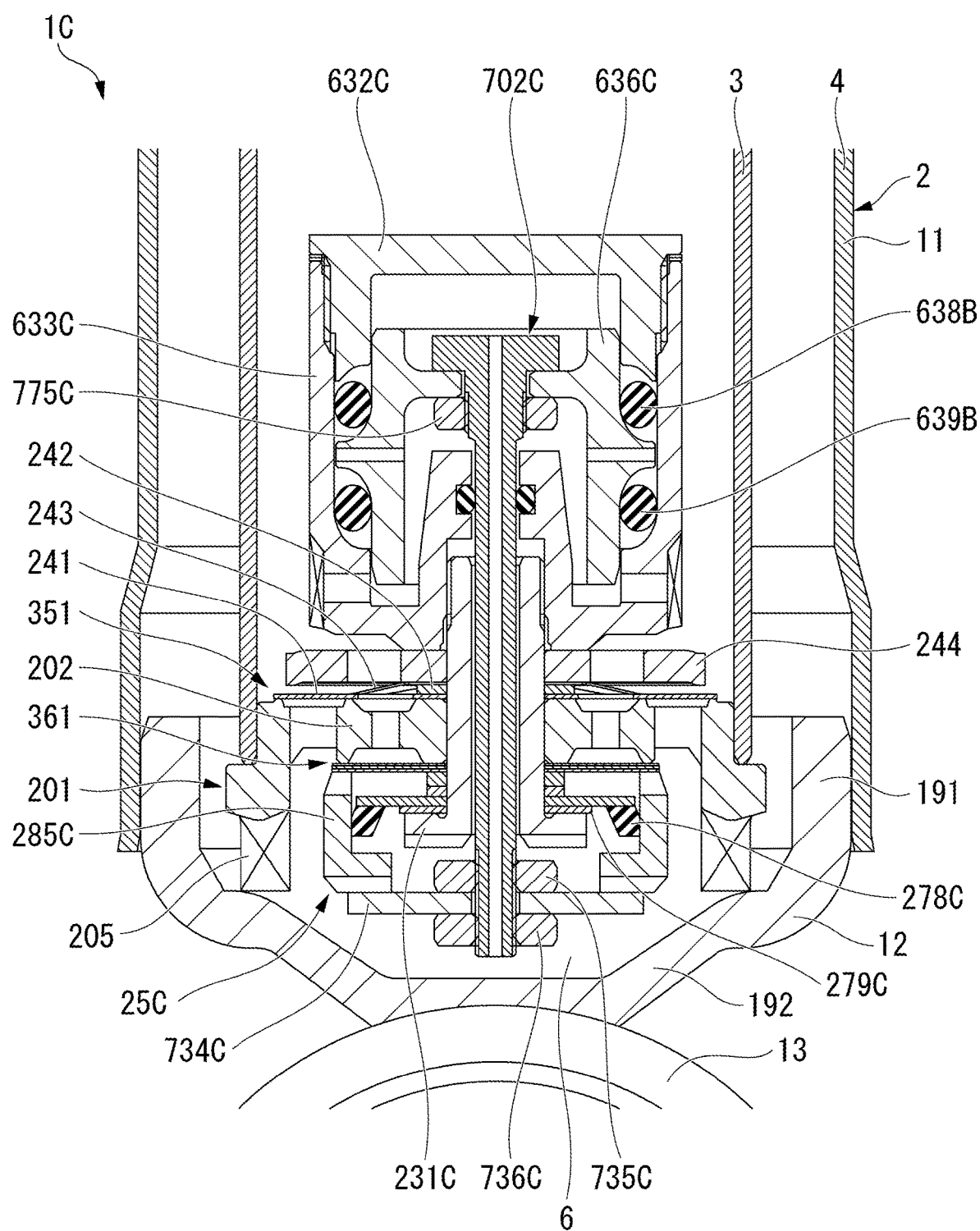
FIG. 16 is a cross-sectional view of the vicinity of a base valve illustrating the shock absorber according to a fourth embodiment of the present invention.

As illustrated in FIG. 16, in a shock absorber 1C of the fourth embodiment, a base valve 25C is partially different from the base valve 25B of the third embodiment. The base valve 25C is also provided on a bottom portion 192 of an outer cylinder 4. The base valve 25C separates one lower chambers 20 within a cylinder 3 and a reservoir chamber 6 between the outer cylinder 4 and the cylinder 3.

Figure 17:
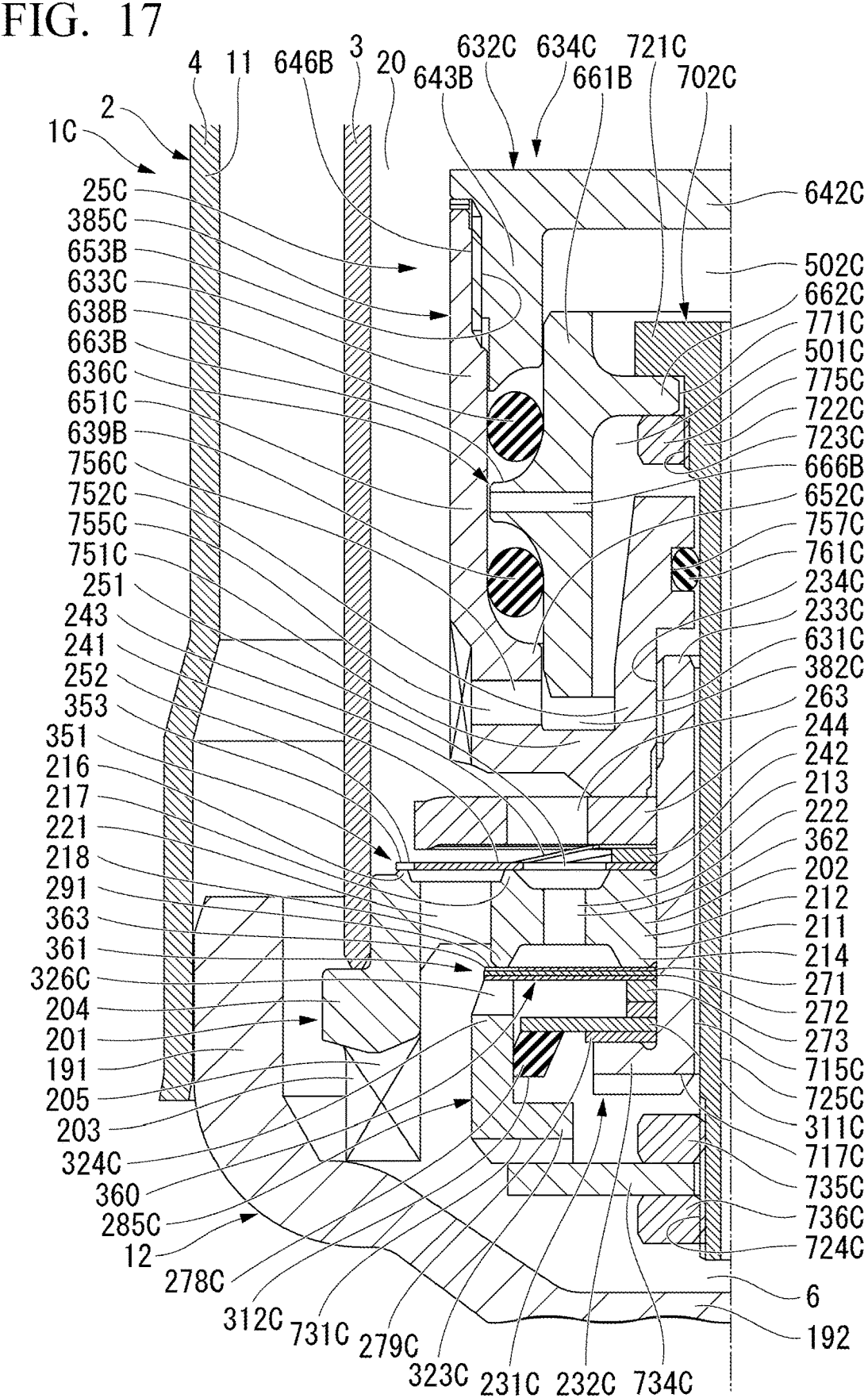
FIG. 17 is a cross-sectional view of one side of the vicinity of the base valve illustrating the shock absorber according to the fourth embodiment of the present invention.
Figure 18:
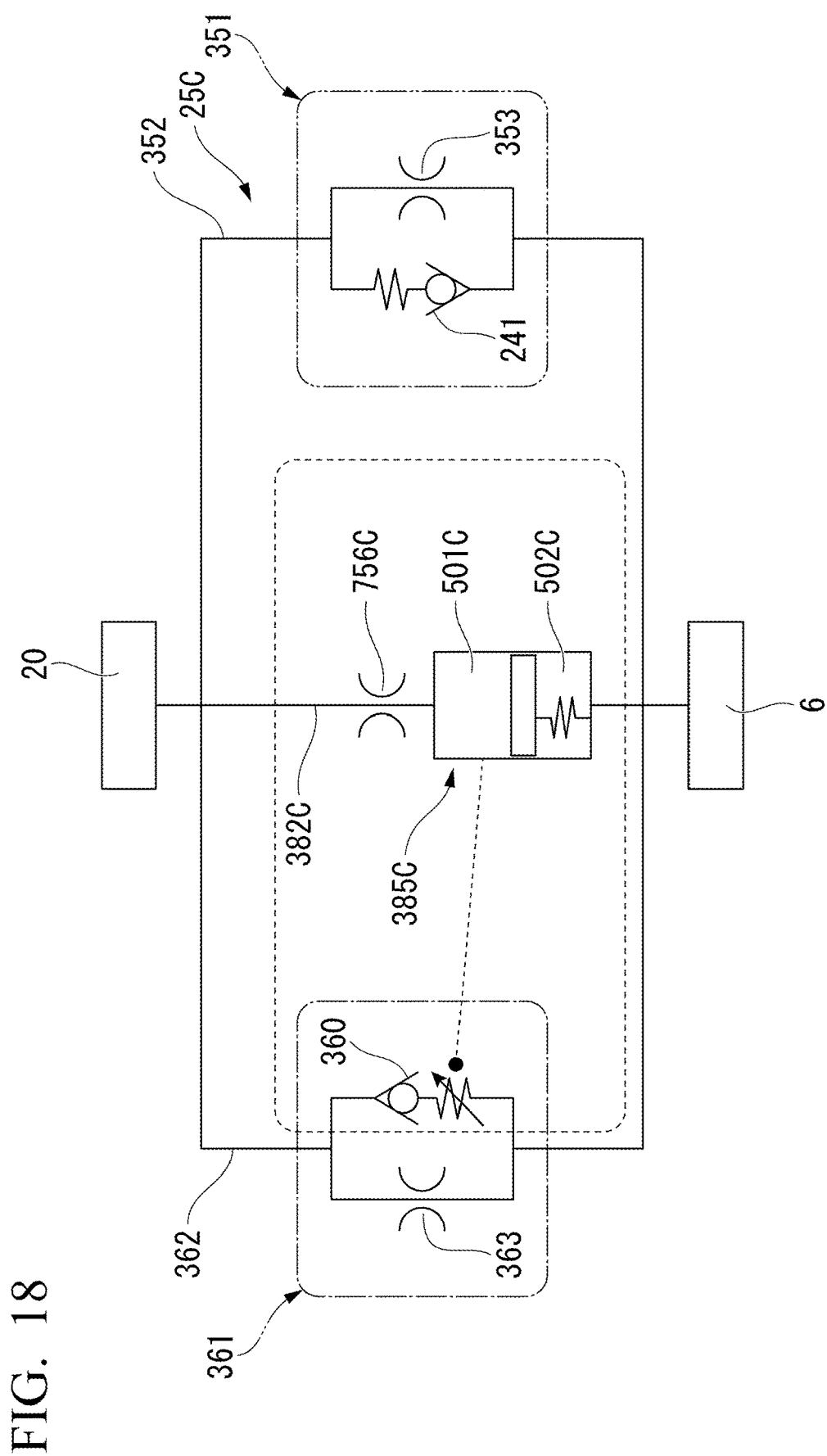
FIG. 18 is a hydraulic circuit diagram of the base valve illustrating the shock absorber according to the fourth embodiment of the present invention.

As illustrated in FIG. 17, the base valve 25C includes a pin member 231C (shaft member) and a connection pin 702C instead of the pin member 231B.

The pin member 231C is a hollow bolt. The pin member 231C includes a head 232C that can engage with a fastening tool, and a cylindrical shaft portion 233C that extends from the center of the head 232C and has a diameter smaller than the minimum outer diameter of the head 232C. A male screw 234C is formed on the outer peripheral portion of the shaft portion 233C on a side opposite to the head 232C in the axial direction. An insertion hole 715C penetrating the pin member 231C in the axial direction is formed in the center of the pin member 231C in the radial direction. A passage groove 717C penetrating the head 232C in the radial direction is formed on the side of the head 232C which is opposite to the shaft portion 233C in the axial direction. The passage groove 717C is perpendicular to the insertion hole 715C.

A base valve member 201, a suction valve 241, a disk 242, a spring disk 243, and a regulation disk 244 similar to those of the first embodiment are fitted to the shaft portion 233C of the pin member 231C.

The connection pin 702C is a hollow bolt. The connection pin 702C includes a head 721C that can engage with a fastening tool, and a cylindrical shaft portion 722C that extends from the center of the head 721C and has a diameter smaller than the minimum outer diameter of the head 721C. A male screw 723C is formed on the outer peripheral portion of the shaft portion 722C on the side of the head 721C in the axial direction. A male screw 724C is also formed on the outer peripheral portion of the shaft portion 722C on a side opposite to the head 721C in the axial direction.

An axial passage hole 725C penetrating the connection pin 702C in the axial direction is formed in the center of the connection pin 702C in the radial direction. In the connection pin 702C, the shaft portion 722C is inserted into the insertion hole 715C of the pin member 231C.

The base valve 25C includes one disk 271, a plurality of disks 272, and a plurality of disks 273 similar to those of the first embodiment on the bottom portion 192 side in the axial direction of the base portion 202 of the base valve member 201, in order from the base portion 202 side in the axial direction. The disks 271 to 273 are fitted to the shaft portion 233C of the pin member 231C.

The base valve 25C includes one partitioning disk 278C (closing member) and one disk 279C on the side of the disk 273 which is opposite to the disk 272 in the axial direction, instead of the disks 275, 276, 279, and 280, the biasing disk 274, the spacer 277, the partitioning disk 278, and the stopper disk 281 of the first embodiment.

In addition, the base valve 25C is provided with a cylindrical spool member 285C on the side of the disk 272 which is opposite to the disk 271 in the axial direction so as to surround the disk 273, the partitioning disk 278C, and the disk 279C on the outer side in the radial direction. The spool member 285C can change a biasing force against the main valve 360 constituted by the disks 271 and 272 by moving in the axial direction.

Both the disk 279C and the spool member 285C are made of a metal. The disk 279C has a perforated circular flat plate shape, having a fixed thickness, into which the shaft portion 233C of the pin member 231C can be fitted. The disk 279C abuts on the head 232C of the pin member 231C. The partitioning disk 278C has an annular shape into which the shaft portion 233C of the pin member 231C can be fitted.

The partitioning disk 278C includes a metal disk 311C and a rubber sealing member 312C fixed to the outer peripheral side of the disk 311C. The partitioning disk 278C is elastically deformable.

The sealing member 312C is integrated with the disk 311C by baking. The disk 311C has a perforated circular flat plate shape, having a fixed thickness, into which the shaft portion 233C of the pin member 231C can be fitted. The disk 311C has an outer diameter larger than the outer diameter of the disk 273.

The sealing member 312C is fixed to the outer peripheral side of the disk 311C in an annular shape.

The sealing member 312C protrudes from the disk 311C in the axial direction. The sealing member 312C has an outer diameter that increases as the distance from the disk 311C increases in the axial direction, and an inner diameter that increases as the distance from the disk 311C increases in the axial direction. The partitioning disk 278C abuts on the disks 273 and 279C in the disk 311C. The sealing member 312C extends from the disk 311C toward the disk 279C in the axial direction. The sealing member 312C has a gap between the disk 279C and the head 232C of the pin member 231C in the radial direction and surrounds them on the outer side in the radial direction. The disk 279C has an outer diameter smaller than the minimum inner diameter of the sealing member 312C.

The spool member 285C is a rigid body that is difficult to deform. The spool member 285C includes a cylindrical pressing portion 324C and an inner flange portion 323C extending inward in the axial direction from one end portion of the pressing portion 324C in the axial direction.

In the spool member 285C, the pressing portion 324C is in contact with the sealing member 312C of the partitioning disk 278C over the entire circumference. Thereby, the spool member 285C is centered with respect to the partitioning disk 278C and is centered with respect to the shaft portion 233C of the pin member 231C.

The inner diameter of the pressing portion 324C is slightly larger than the outer diameter of the disk 311C of the partitioning disk 278C. The inner flange portion 323C has a perforated circular flat plate shape. In the pressing portion 324C, a notch 326C crossing the pressing portion 324C in the radial direction is formed on a side opposite to the inner flange portion 323C in the axial direction. A plurality of notches 326C are formed at equal intervals in the circumferential direction of the pressing portion 324C. In the inner flange portion 323C, a through groove 731C penetrating the inner flange portion 323C and the pressing portion 324C in the radial direction is formed.

A support disk 734C is disposed on the side of the spool member 285C which is opposite to the disk 272 in the axial direction. The support disk 734C is made of a metal and has a perforated circular flat plate shape having a fixed thickness. The shaft portion 722C of the connection pin 702C is inserted into the support disk 734C in the radial direction.

The inner peripheral side of the support disk 734C is fixed to the shaft portion 722C of the connection pin 702C with a pair of nuts 735C and 736C. The pair of nuts 735C and 736C are screwed onto the male screw 724C of the shaft portion 722C to sandwich the support disk 734C from both sides in the axial direction.

A frequency sensitive mechanism 385C, which is partially different from the frequency sensitive mechanism 385B of the third embodiment, is screwed onto the male screw 234C of the shaft portion 233C of the pin member 231C. The frequency sensitive mechanism 385C includes a housing 634C including a housing main body 633C in which a female screw 631C to be screwed onto the male screw 234C of the pin member 231C is formed, and a lid member 632C attached to close an opening side at one end of the housing main body 633C, a free piston 636C slidably inserted into the housing 634C, and O-rings 638B and 639B interposed between the free piston 636C and the housing 634C.

The lid member 632C is partially different from the lid member 632B and includes a disk-shaped lid substrate portion 642C and a lid outer tubular portion 643B similar to the lid member 632B extending from the outer peripheral side of the lid substrate portion 642C to one side in the axial direction.

The lid member 632C differs from the lid member 632B in that the lid inner cylinder portion 641B is not formed, and the lid substrate portion 642C closes the inner side of the lid outer tubular portion 643B in the radial direction. A male screw 646B similar to that of the lid member 632B is formed on the outer peripheral surface of the lid outer tubular portion 643B.

The housing main body 633C is made of a metal and is formed mainly by cutting. The housing main body 633C includes a cylindrical main body 651C, an inner annular protrusion 652C that protrudes inward in the radial direction from one end of the main body portion 651C in the axial direction, an extension portion 751C extending inward in the radial direction from one end of the inner annular protrusion 652C in the axial direction, and an inner tubular portion 752C extending from the inner peripheral side of the extension portion 751C to the other side in the axial direction.

A through-hole 755C penetrating the inner annular protrusion 652C in the radial direction is formed in the inner annular protrusion 652C. A passage in the through-hole 755C is an orifice 756C. An annular sealing groove 757C is formed in the inner peripheral portion of the inner tubular portion 752C on a side opposite to the extension portion 751C in the axial direction.

The shaft portion 722C of the connection pin 702C is inserted into the inner tubular portion 752C in the radial direction. The sealing groove 757C accommodates a sealing member 761C that seals a space between the shaft portion 722C and the inner tubular portion 752C.

In the housing main body 633C, a female screw 653B is formed on the inner peripheral portion of the main body portion 651C on a side opposite to the inner annular protrusion 652C in the axial direction. The male screw 646B of the lid member 632C is screwed into the female screw 653B, and these are integrated into the housing 634C.

The free piston 636C is partially different from the free piston 636B. The free piston 636C includes a piston cylinder portion 661B and an outer annular protrusion 663B similar to those of the free piston 636B, and a piston closing plate portion 662C which is partially different from the piston closing plate portion 662B.

A through-hole 771C penetrating the piston closing plate portion 662C in the axial direction is formed in the center of the piston closing plate portion 662C in the radial direction. The free piston 636C is provided in the housing 634C in a direction in which the piston closing plate portion 662C approaches the lid substrate portion 642C of the lid member 632C. The free piston 636C is slidable in the housing 634C in the axial direction.

The O-ring 638B is provided between the outer annular protrusion 663B of the free piston 636C and the lid outer tubular portion 643B of the lid member 632B. The O-ring 639B is provided between the outer annular protrusion 663B of the free piston 636C and the inner annular protrusion 652C of the housing main body 633C.

When the free piston 636C moves toward the lid member 632C in the axial direction with respect to the housing 634C, the outer annular protrusion 663B and the lid outer tubular portion 643B of the lid member 632C sandwich and elastically deform the O-ring 638B. Further, when the free piston 636C moves to a side opposite to the lid member 632C in the axial direction with respect to the housing 634C, the outer annular protrusion 663B and the inner annular protrusion 652C of the housing main body 633C sandwich and elastically deform the O-ring 639B.

In the frequency sensitive mechanism 385C, the housing 634C is screwed into the male screw 234C of the pin member 231C in the female screw 631C. Thereby, the housing 634C clamps the regulation disk 244, the spring disk 243, the disk 242, the suction valve 241, the base valve member 201, the disk 271, the plurality of disks 272, and the plurality of disks 273, and at least the inner peripheral sides of the partitioning disk 278C and the disk 279C in the axial direction, together with the head 232C of the pin member 231C.

In the frequency sensitive mechanism 385C, the shaft portion 722C of the connection pin 702C is inserted into the through-hole 771C of the piston closing plate portion 662C of the free piston 636C and the inner tubular portion 752C in the radial direction. The piston closing plate portion 662C of the free piston 636C is axially sandwiched between the head 721C of the connection pin 702C and a nut 775C screwed onto the male screw 723C on the head 721C side of the connection pin 702C. Thereby, the free piston 636C is fixed to the connection pin 702C on the head 721C side in the axial direction of the shaft portion 722C.

The support disk 734C is fixed to the side of the connection pin 702C which is opposite to the head 721C in the axial direction of the shaft portion 722C. In other words, the support disk 734C is connected to the free piston 636C through the connection pin 702C. The support disk 734C constitutes the frequency sensitive mechanism 385C together with the connection pin 702C and the nuts 735C, 736C and 775C. The support disk 734C of the frequency sensitive mechanism 385C is provided on the bottom portion 192 side of the base valve 25C.

In the frequency sensitive mechanism 385C, the housing main body 633C and the extension portion 751C side of the free piston 636C in the axial direction constitute a pilot chamber 501C that communicates with the lower chamber 20 through the orifice 756C in the through-hole 755C of the housing main body 633C. The pilot chamber 501C includes a passage in a passage hole 666B of the free piston 636C and a space between the O-rings 638B and 639B.

The pilot chamber 501C generates a biasing force against the main valve 360 in the closing direction in the spool member 285C through the free piston 636C, the connection pin 702C, and the support disk 734C.

In the frequency sensitive mechanism 385C, a space between the O-ring 638B and the lid outer tubular portion 643B of the lid member 632C, a space between the free piston 636C and the lid substrate portion 642C of the lid member 632C, and a passage in the axial passage hole 725C of the connection pin 702C constitute a reservoir communication chamber 502C that communicates with the reservoir chamber 6. Communication between the reservoir communication chamber 502C and the pilot chamber 501C is blocked by the O-ring 638B.

A lower outer seat portion 218 of the base valve member 201 and the main valve 360 that abuts on the lower outer seat portion 218 and opens and closes the inner passage hole 222 of the base valve member 201 constitute a damping force generation mechanism 361 on a contraction side. A passage in the passage hole 251 of the suction valve 241, a passage in the inner passage hole 222 of the base valve member 201, and a passage between the main valve 360 and the lower outer seat portion 218, which is generated when the valve is opened, constitute a contraction-side first passage 362 that allows the lower chamber 20 and the reservoir chamber 6 to communicate with each other, similar to the first embodiment.

In the first passage 362, an oil liquid flows out from one lower chambers 20 in the cylinder 3 toward the reservoir chamber 6 due to the movement of the piston 18. A passage in a notch 291 provided in the disk 271 constitutes a fixed orifice 363.

The main valve 360 of the damping force generation mechanism 361 is provided in the first passage 362 and generates a damping force. The first passage 362 is provided in the base valve 25C.

The orifice 756C of the housing main body 633C, the pilot chamber 501C, the reservoir communication chamber 502C, and a passage in the axial passage hole 725C of the connection pin 702C constitute a second passage 382C provided in parallel with the first passage 362.

The second passage 382C is provided in parallel with the first passage 362 in the base valve 25C. The frequency sensitive mechanism 385C is provided in the second passage 382C. The support disk 734C of the frequency sensitive mechanism 385C is provided on the bottom portion 192 side of the base valve 25C. The partitioning disk 278C is movable with respect to the spool member 285C. The partitioning disk 278C blocks the flow of an oil liquid through a gap between the partitioning disk 278C and the spool member 285C.

A hydraulic circuit diagram of the base valve 25C described above is as illustrated in FIG. 18.

That is, the damping force generation mechanism 361 including the main valve 360 and the fixed orifice 363 is provided in the contraction-side first passage 362 that allows the lower chamber 20 and the reservoir chamber 6 to communicate with each other.

In addition, the second passage 382C provided in parallel with the first passage 362 communicates with the pilot chamber 501C of the frequency sensitive mechanism 385C through the orifice 756C. The reservoir communication chamber 502C of the second passage 382C communicates with the reservoir chamber 6. The pilot chamber 501C applies its pressure to the main valve 360 in the closing direction.

Next, operations of the base valve 25C will be described.

In a contraction stroke when a piston frequency is low, the volume of an oil liquid that enters the pilot chamber 501C is large. When the connection pin 702C integrated with the free piston 636C is moved to a side opposite to the bottom portion 192, and the spool member 285C pushed by the support disk 734C integrated with the connection pin 702C contacts the main valve 360, the free piston 636C stops moving. The pilot pressure in the pilot chamber 501C rises.

As the pilot pressure rises, a force of pushing the free piston 636C upward increases. As a result, an injection-valve opening pressure of the main valve 360 rises, and a damping force on the contraction side becomes hard.

On the other hand, the amount of movement of the free piston 636C and the connection pin 702C is small for an input with a high piston frequency. Even when the spool member 285C does not contact the main valve 360, or the spool member 285C contacts the main valve 360, a load applied to the main valve 360 in the closing direction is sufficiently small. For this reason, an injection-valve opening pressure of the main valve 360 is low, and a damping force on the contraction side has a soft characteristic.

In this manner, even with a structure in which a portion of the frequency sensitive mechanism 385C is accommodated in the lower chamber 20, frequency dependency of a contraction-side damping force (soft damping force at a high frequency) can be provided as in the first to third embodiments.

Modification Example

Figure 19:
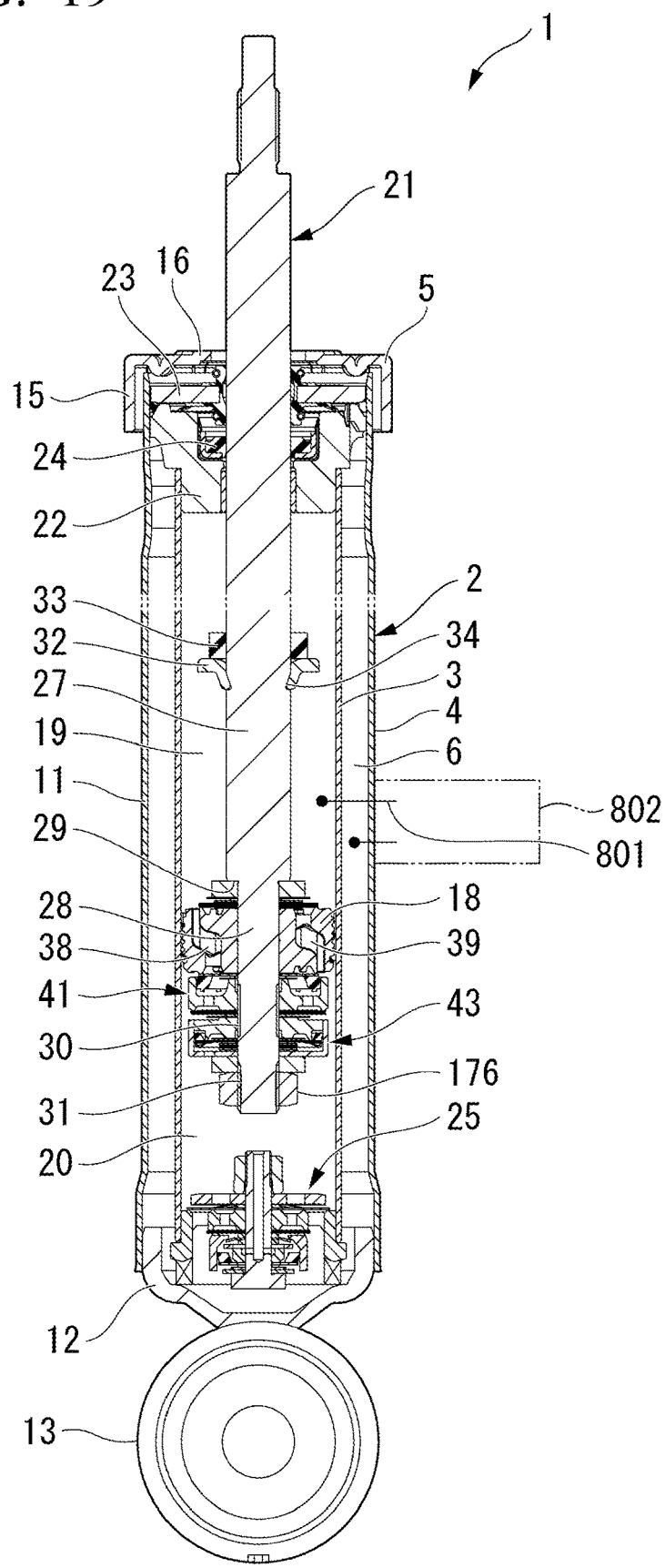
FIG. 19 is a cross-sectional view illustrating a modification example of the shock absorber according to the first embodiment of the present invention.

Note that, as illustrated in FIG. 19 as a modification example of the first embodiment, in the first to fourth embodiments, a third passage 801 that connects the upper chamber 19, which is one of the chambers in the cylinder 3, and the reservoir chamber 6, and a damping force adjustment mechanism 802 that controls the flow of a hydraulic fluid in the third passage 801 to adjust a damping force may be provided.

In this case, the damping force adjustment mechanism 802 can be externally attached to the outer cylinder 4. The damping force adjustment mechanism 802 has a structure in which an oil liquid flows in one direction from the upper chamber 19 to the reservoir chamber 6. The damping force adjustment mechanism 802 controls a flow channel between the upper chamber 19 and the reservoir chamber 6 with a current to adjust a damping force. The damping force adjustment mechanism 802 can adjust a damping force from softness to hardness in accordance with road surface conditions and vehicle body movement by controlling an injection-valve opening pressure with a current.

In a case where the damping force adjustment mechanism 802 is provided, the base valves 25, 25A, 25B, and 25C in the first to fourth embodiments which define the lower chamber 20, which is the other chamber in the cylinder 3, and the reservoir chamber 6 are configured such that the respective frequency sensitive mechanisms 385, 385A, 385B and 385C do not cooperate with the damping force adjustment mechanism 802 and mechanically adjust a damping force. In this case, in addition to varying a damping force from softness to hardness by electronic control of the damping force adjustment mechanism 802, a reduction in damping force based on a high frequency input can be appropriately set independently for an extension stroke and a contraction stroke.

By mounting such a damping force adjustment mechanism 802, when a vehicle runs on an undulating road surface mixed with a minute high-frequency input, such as on a general road, it is possible to provide a performance aimed at by general control suspensions at a low cost, which blocks a minute high-frequency input (vibration) while giving a firm damping feeling to a low frequency and giving a flat feeling on a spring.

The structures of the base valves 25, and 25A to 25C of the first to fourth embodiments may be provided in the piston 18 and the piston rod 21. In this case, the piston rod 21 serves as a shaft member.

According to a first aspect of the embodiments described above, a shock absorber includes a cylinder which is filled with a working fluid, a piston which is provided in the cylinder and divides the inside of the cylinder into two chambers, a piston rod in which one end side is connected to the piston, and the other end side extends to the outside of the cylinder, a first passage through which the working fluid flows out from one of the two chambers due to movement of the piston, a second passage which is provided in parallel with the first passage, a disk which is provided in the first passage and generates a damping force, a spool member, having a tubular shape, which is capable of changing a biasing force against the disk by moving in an axial direction, a pilot chamber which is provided in the second passage, located on an inner peripheral side of the spool member, and generates a biasing force against the disk in the spool member, and a closing member which blocks a flow of the working fluid from the pilot chamber to the other chamber out of the two chambers and is provided to be movable with respect to the spool member. This enables miniaturization.

In a second aspect according to the first aspect, the closing member includes a sealing member between the closing member and the spool member.

In a third aspect according to the second aspect, the closing member is provided by baking the sealing member.

In a fourth aspect according to any one of the first to third aspects, a shaft member is inserted into the disk, the spool member, and the closing member, and the second passage is formed in the shaft member.

In a fifth aspect according to any one of the first to fourth aspects, the shock absorber further includes a reservoir chamber which is provided on an outer peripheral side of the cylinder and is filled with a hydraulic fluid and a gas, a third passage which connects the one chamber and the reservoir chamber, a base valve which defines the other chamber and the reservoir chamber, and a damping force adjustment mechanism which controls a flow of a hydraulic fluid in the third passage to adjust a damping force, in which the first passage and the second passage are provided in the base valve.

In a sixth aspect, a shock absorber includes a cylinder which is filled with a working fluid, a piston which is provided in the cylinder and divides the inside of the cylinder into two chambers, a piston rod in which one end side is connected to the piston, and the other end side extends to the outside of the cylinder, a first passage through which the working fluid flows out from one of the two chambers due to movement of the piston, a disk which is provided in the first passage and generates a damping force, an outer cylinder, having a bottomed tubular shape, which is provided on an outer peripheral side of the cylinder, and a base valve which is provided at a bottom of the outer cylinder and separates the one chamber and a chamber between the outer cylinder and the cylinder, in which the base valve is provided with a second passage which is provided in parallel with the first passage and a frequency sensitive mechanism which is provided in the second passage and varies a damping force in accordance with a frequency of the piston, and the frequency sensitive mechanism is provided on the bottom side of the base valve. This enables miniaturization.

INDUSTRIAL APPLICABILITY

According to the present invention, it is possible to provide a shock absorber that can be miniaturized.

REFERENCE SIGNS LIST

1, 1A to 1C Shock absorber
3 Cylinder
4 Outer cylinder
6 Reservoir chamber (the other chamber)
18 Piston
19 Upper chamber
20 Lower chamber (one chamber)
21 Piston rod
25, 25A to 25C Base valve
192 Bottom portion
231, 231A to 231C Pin member 231 (shaft member)
278, 278C Partitioning disk (closing member)
285, 285C Spool member
312, 312C Sealing member
360, 360A Main valve
362 First passage
371, 501C Pilot chamber
382, 382A, 382B, 382C Second passage 385, 385A to 385C Frequency sensitive mechanism
801 Third passage
802 Damping force adjustment mechanism

The invention claimed is:

1. A shock absorber comprising:
a cylinder which is filled with a working fluid;
a piston which is provided in the cylinder and divides the inside of the cylinder into two chambers;
a piston rod in which one end side is connected to the piston, and the other end side extends to the outside of the cylinder;
a first passage through which the working fluid flows out from one of the two chambers due to movement of the piston;
a second passage which is provided in parallel with the first passage;
a disk which is provided in the first passage and generates a damping force;
a spool member, having a tubular shape, which is capable of changing a biasing force against the disk by moving in an axial direction;
a pilot chamber which is provided in the second passage, located on an inner peripheral side of the spool member, and generates a biasing force against the disk in the spool member; and
a closing member which blocks a flow of the working fluid from the pilot chamber to the other chamber out of the two chambers and is provided to be movable with respect to the spool member,
wherein the closing member includes a sealing member being provided by a baked portion between the closing member and the spool member, and
wherein the closing member is configured to bend such that the volume of the pilot chamber expands when the internal pressure of the pilot chamber increases.

2. The shock absorber according to claim 1, wherein a shaft member is inserted into the disk, the spool member, and the closing member, and the second passage is formed in the shaft member.

3. The shock absorber according to claim 1, further comprising:
a reservoir chamber which is provided on an outer peripheral side of the cylinder and is filled with a hydraulic fluid and a gas;
a third passage which connects the one chamber and the reservoir chamber;
a base valve which defines the other chamber and the reservoir chamber; and
a damping force adjustment mechanism which controls a flow of a hydraulic fluid in the third passage to adjust a damping force,
wherein the first passage and the second passage are provided in the base valve.

* * * * *